US 8,503,302 B2

(12) United States Patent
Golic et al.

(10) Patent No.: US 8,503,302 B2
(45) Date of Patent: Aug. 6, 2013

(54) METHOD OF DETECTING ANOMALIES IN A COMMUNICATION SYSTEM USING NUMERICAL PACKET FEATURES

(75) Inventors: Jovan Golic, Turin (IT); Rosalia D'Alessandro, Turin (IT)

(73) Assignee: Telecom Italia S.p.A., Milan (IT)

( * ) Notice: Subject to any disclaimer, the term of this patent is extended or adjusted under 35 U.S.C. 154(b) by 372 days.

(21) Appl. No.: 12/811,204

(22) PCT Filed: Dec. 31, 2007

(86) PCT No.: PCT/EP2007/011473
§ 371 (c)(1),
(2), (4) Date: Jun. 29, 2010

(87) PCT Pub. No.: WO2009/082022
PCT Pub. Date: Jul. 9, 2009

(65) Prior Publication Data
US 2010/0284283 A1 Nov. 11, 2010

(51) Int. Cl.
*H04L 29/00* (2006.01)
(52) U.S. Cl.
USPC ................ 370/235; 370/252; 726/13; 726/26
(58) Field of Classification Search
None
See application file for complete search history.

(56) References Cited

U.S. PATENT DOCUMENTS

| | | | |
|---|---|---|---|
| 6,601,014 B1 | 7/2003 | Dempsey | |
| 7,272,853 B2 * | 9/2007 | Goodman et al. | 726/13 |
| 7,665,131 B2 * | 2/2010 | Goodman et al. | 726/13 |
| 8,069,182 B2 * | 11/2011 | Pieper | 707/769 |
| 2003/0200441 A1 | 10/2003 | Jeffries et al. | |
| 2004/0220984 A1 | 11/2004 | Dudfield et al. | |
| 2005/0022008 A1 * | 1/2005 | Goodman et al. | 713/201 |
| 2007/0118904 A1 * | 5/2007 | Goodman et al. | 726/22 |
| 2007/0280114 A1 | 12/2007 | Chao et al. | |

FOREIGN PATENT DOCUMENTS

WO WO 2007/002838 A2 1/2007

OTHER PUBLICATIONS

International Search Report from the European Patent Office for International Application No. PCT/EP2007/011473 (Mail date: Oct. 10, 2008).
Li. et al., "DDoS Detection and Wavelets," Telecommunication Systems—Modeling, Analysis, Design and Management, vol. 28, Nos. 3-4, pp. 435-451, (2002).
Ye et al., "EWMA Techniques for Computer Intrusion Detection Through Anomalous Changes in Event Intensity," Qual. Reliab. Engng. Int., vol. 18, pp. 443-451, (2002).

(Continued)

*Primary Examiner* — Jay P Patel
(74) *Attorney, Agent, or Firm* — Finnegan, Henderson, Farabow, Garrett & Dunner, L.L.P.

(57) ABSTRACT

A method of detecting anomalies in a communication system, includes: providing a first packet flow portion and a second packet flow portion; extracting samples of a numerical feature associated with a traffic status of the first and second packet flow portions; computing from said extracted samples a first statistical dispersion quantity and a second statistical dispersion quantity of the numerical feature associated with the first and second packet flow portions, respectively; computing from the dispersion quantities a variation quantity representing a dispersion change from the first packet flow portion to the second packet flow portion; comparing the variation quantity with a comparison value; and detecting an anomaly in the system in response to said comparison.

23 Claims, 7 Drawing Sheets

(56) References Cited

OTHER PUBLICATIONS

Okabe et al., "Statistical Traffic Identification Method Based on Flow-Level Behavior for Fair VoIP Service," Proceedings of the 1st IEEE Workshop on VoIP Management and Security, Vancouver, Canada, p. 33-38, (2006).

Mandjes et al., "Load Characterization and Anomaly Detection for Voice Over IP Traffic," IEEE Transactions on Neural Networks, vol. 16, No. 5, pp. 1019-1026, (2005).

Murray et al., "Bandwidth Estimation: Metrics, Measurement Techniques, and Tools," IEEE Network, IEEE Service Center, New York, vol. 17, No. 6, pp. 27-35, (2003).

Ishida et al., "Fairness and Utilization in Multipath Network Flow Optimization," IEEE International Conference on Industrial Informatics, pp. 1096-1101, (2006).

Li et al., "On the Effectiveness of DDoS Attacks on Statistical Filtering," 24th Annual Joint Conference of the IEEE Computer and Communications Societies, vol. 2, pp. 1373-1383, (2005).

"Communication Under Rule 71(3) EPC", Intention to Grant by European Patent Office dated Dec. 28, 2010 in corresponding European Application No. 07 857 164.3-2416.

EPO International Search Report for International Application No. PCT/EP2007/011474, mailed Sep. 25, 2008.

Barford et al.; "Characteristics of Network Traffic Flow Anomalies", Proceeding of the 1st ACM SIGCOMM Workshop on Internet Measurements, San Francisco, CA, pp. 69-73, (2001).

Peng, T. et al., "Proactively Detecting Distributed Denial of Service Attacks Using Source IP Address Monitoring," Proceedings of Networking 2004, Lecture Notes in Computer Science, vol. 3042, pp. 771-782, (2004).

Lakhina, A. et al., "Mining Anomalies Using Traffic Feature Distributions," Proceedings of SIGCOMM '05, Philadelphia, PA, pp. 217-228, (2005).

Wagner, A. et al., "Entropy Based Worm and Anomaly Detection in Fast IP Networks," Proc. 14. IEEE International Workshops on Enabling Technologies Infrastructure for Collaborative Enterprises, Linköping, Sweden, pp. 172-177, (2005).

Haraldsson, E., "DDoS Attack Detection Based on Netflow Logs," Student Thesis SA-2003.35, Swiss Federal Institute of Technology, Zurich, 23 pages, (2003).

Weisskopf, A., "Plug-ins for DDoS Attack Detection in Realtime," Semester Thesis SA-2004.19, Swiss Federal Institute of Technology, Zurich, 3 pages, (2004).

Kumar, K. et al., "A Distributed Approach Using Entropy to Detect DDoS Attacks in ISP Domain," International Conference on Signal Processing, Communications and Networking, pp. 331-337, (2007).

Liying, L. et al., "DDoS Attack Detection Algorithms Based on Entropy Computing," Information and Communications Security, vol. 4861, No. 12, pp. 452-466, (2007).

Feinstein, L. et al., "Statistical Approaches to DDoS Attack Detection and Response," Proceedings DARPA Information Survivability Conference and Exposition, IEEE Compu, vol. 1, pp. 303-314, (2003).

\* cited by examiner

METHOD OF DETECTING ANOMALIES IN A COMMUNICATION SYSTEM USING NUMERICAL PACKET FEATURES

CROSS REFERENCE TO RELATED APPLICATION

This application is a national phase application based on PCT/EP2007/011473, filed Dec. 31, 2007, the content of which is incorporated herein by reference.

BACKGROUND

1. Technical Field

The present invention relates to anomaly detection on packet switched communication systems. Particularly, the present invention is related to statistical methods for detecting network traffic anomalies due to network attacks or to communication system failures.

2. Description of the Related Art

Several types of attacks are known, such as: (distributed) denial of service ((D)DoS) attacks, scanning attacks, SPAM or SPIT attacks, and malicious software attacks.

Denial-of-Service (DoS) attacks and, in particular, distributed DoS (DDoS) attacks are commonly regarded as a major threat to the Internet. A DoS attack is an attack on a computer system network that causes a loss of service or network connectivity to legitimate users, that is, unavailability of services. Most common DoS attacks aim at exhausting the computational resources, such as connection bandwidth, memory space, or CPU time, for example, by flooding a target network node by valid or invalid requests and/or messages. They can also cause disruption of network components or disruption of configuration information, such as routing information, or can aim at disabling an application making it unusable. In particular, the network components (e.g., servers, proxies, gateways, routers, switches, hubs, etc.) may be disrupted by malicious software attacks, for example, by exploiting buffer overflows or vulnerabilities of the underlying operating system or firmware.

A DDoS attack is a DoS attack that, instead of using a single computer as a base of attack, uses multiple compromised computers simultaneously, possibly a large or a very large number of them (e.g., millions), thus amplifying the effect. Altogether, they flood the network with an overwhelming number of packets which exhaust the network or application resources. In particular, the packets may be targeting one particular network node causing it to crash, reboot, or exhaust the computational resources. The compromised computers, which are called zombies, are typically infected by malicious software (worm, virus, or Trojan) in a preliminary stage of the attack, which involves scanning a large number of computers searching for those vulnerable. The attack itself is then launched at a later time, either automatically or by a direct action of the attacker.

(D)DoS attacks are especially dangerous for Voice over IP (VoIP) applications, e.g., based on the Session Initiation Protocol (SIP). In particular, the underlying SIP network dealing only with SIP signalling packets is potentially vulnerable to request or message flooding attacks, spoofed SIP messages, malformed SIP messages, and reflection DDoS attacks. Reflection DDoS attacks work by generating fake SIP requests, as an example, with a spoofed (i.e. simulated) source IP address which falsely identify a victim node as the sender, and by sending or multicasting said SIP requests to a large number of SIP network nodes, which all respond to the victim node, and repeatedly so if they do not get a reply, hence achieving an amplification effect.

SPAM attacks consist in sending unsolicited electronic messages (e.g., through E-mail over the Internet), with commercial or other content, to numerous indiscriminate recipients. Analogously, SPIT (SPam over Internet Telephony) attacks consist in sending SPAM voice messages in VOID networks. Malicious software attacks consist in sending malicious software, such as viruses, worms, Trojan, or spyware, to numerous indiscriminate recipients, frequently in a covert manner. Scanning or probing attacks over the Internet consist in sending request messages in large quantities to numerous indiscriminate recipients and to collect the information from the provoked response messages, particularly, in order to detect vulnerabilities to be used in subsequent attacks. For example, in port scanning attacks, the collected information consists of the port numbers used by the recipients.

Attack detection techniques are known which utilize a description (signature) of a particular attack (e.g., a virus, worm, or other malicious software) and decide if the observed traffic data is consistent with this description or not; the attack is declared in the case of detected consistency.

Furthermore, anomaly detection techniques are known which utilize a description (profile) of normal/standard traffic, rather than anomalous attack traffic, and decide if the observed traffic data is consistent with this description or not; an attack or anomalous traffic is declared in the case of detected inconsistency.

Unlike attack detection techniques, anomaly detection techniques do not require prior knowledge of particular attacks and as such are in principle capable of detecting previously unknown attacks. However, they typically have non-zero false-negative rates, in a sense that they can miss to declare an existing attack. They also typically have higher false-positive rates, in a sense that they can declare anomalous traffic in the case of absence of attacks.

Anomaly detection techniques can essentially be classified into two categories: rule-based techniques and statistic-based or statistical techniques. Rule-based techniques describe the normal behavior in terms of certain static rules or certain logic and can essentially be stateless or stateful. In particular, such rules can be derived from protocol specifications.

On the other hand, statistical anomaly detection techniques describe the normal behavior in terms of the probability distributions of certain variables, called statistics, depending on the chosen data features or parameters.

Paper "DDoS detection and wavelets", L. Li and G. Lee, Telecommunication Systems—Modeling, Analysis, Design and Management, vol. 28, no. 3-4, pp. 435-451, 2005, discloses a method comprising the step of dynamically applying a discrete wavelet transform to overlapping sliding windows of the byte rate curves in time and looking for sudden changes in the logarithms of the associated energy distribution coefficients in order to detect DDoS attacks.

US-A-2004-0220984 describes a method wherein the packet and byte rates are considered as functions of time and, at each time, the mean values and variances of these rates are estimated by using historical data, possibly as Exponentially Weighted Moving Averages (EWMAs), and then a given sample of traffic at a given time is classified by comparing its packet and byte rates with a threshold being proportional to the sum, at the given time, of the historical mean value and the historical standard deviation (i.e., the square root of the variance) multiplied by a positive constant. Anomalous traffic is declared if the threshold is exceeded, i.e., if the observed sample of traffic is classified as an outlier.

U.S. Pat. No. 6,601,014 B1 discloses a method where the mean value and the variance are estimated as the EWMAs, with different, but mutually related associated constants.

Article "EWMA techniques for computer intrusion detection through anomalous changes in event intensity", N. Ye, C. Borror, and Y. Zhang, Qual. Reliab. Engng. Int., vol. 18, pp. 443-451, 2002, describes a method wherein EWMA techniques are applied for dynamically estimating the mean values and variances of the event intensity process derived from the audit trail data describing the activities on a host machine in a computer network. Anomaly detection is based on the outlier classification principle, where the thresholds are determined under certain probabilistic models for the event intensity process. Alternatively, anomaly detection is based on the estimated variance only, which is compared with a reference value and an alert is then declared if the ratio of the two values is too large or too small.

Paper "Statistical traffic identification method based on flow-level behavior for fair VoIP service", T. Okabe, T. Kitamura, and T. Shizuno, Proceedings of the 1st IEEE Workshop on VOID Management and Security, Vancouver, Canada, April 2006, pp. 33-38, describes a flow identification method, for VOID media traffic, using the flow statistics such as the minimal and maximal values of the packet inter-arrival time and some characteristics of the packet size distribution comprising the minimal, maximal, average, and median values as well as the total number of different packet sizes occurring in a flow. The statistics are calculated and compared with reference patterns on short time intervals (e.g., 1 second long) and the verification results are averaged over a longer time interval in order to classify a given flow.

Article "Load characterization and anomaly detection for voice over IP traffic", M. Mandjes, I. Saniee, and A. L. Stolyar, IEEE Transactions on Neural Networks, vol. 16, no. 5, pp. 1019-1026, September 2005, describes a method relating to VOID data traffic that consists in computing the empirical variance estimates of the normalized byte rate on overlapping windows and comparing them with predicted variances that are theoretically obtained under probabilistic models for the number of calls per second. At any time, an anomaly is declared if the ratio of the empirical and theoretical variances is greater than a threshold, which falls in the range between one and two.

BRIEF SUMMARY

The Applicant has observed that the known solutions are not satisfactory with respect to the achieved false-negative and false-positive rates, computational complexity and memory requirements. This could be due to the fact that it is difficult for the normal traffic in communications networks to be described by stable probability distributions. Moreover, it is difficult to define statistical models describing the communication networks that would give rise to sufficiently low false-positive and false-negative rates. It should be also noticed that the complexity of the statistical methods of the prior art techniques may be unacceptably high for high-speed and high-volume communications networks.

The Applicant has noticed that there is a need in the field for achieving an anomaly detection method providing increased reliability and, preferably, reduced computational complexity and memory requirements. In accordance with a particular embodiment, the Applicant has observed that advantages can be obtained by monitoring the statistical behavior of numerical packet features associated with two packet flow portions lying in corresponding time windows that are moving in time. A numerical packet feature (as an example, the byte rate) is any quantity extracted from network packets that can be expressed as numerical data by a real, rational, or integer number in such a way that the feature values can be regarded as mutually close if the difference of the corresponding numbers is relatively small in absolute value.

In a first aspect, the present invention relates to a method (200; 300; 400) of detecting anomalies in a communication system (100), the method comprising:

providing (202; 201$_1$) a first packet flow portion (PFP1) and a second packet flow portion (PFP2);

extracting (203; 303; 203$_1$) samples of a numerical feature (x) associated with a traffic status of the first and second packet flow portions;

computing (204; 304; 204$_1$) from said extracted samples a first statistical dispersion quantity (Dq$_1$) and a second statistical dispersion quantity (Dq$_2$) of the numerical feature associated with the first and second packet flow portions, respectively;

computing (205; 305; 205$_1$; 401) from said dispersion quantities a variation quantity ($\Delta$) representing a dispersion change from the first packet flow portion to the second packet flow portion;

comparing (206; 306; 402) the variation quantity ($\Delta$) with a comparison value (Thr); and detecting (207; 307; 402) an anomaly in the system in response to said comparison.

In the detection method above, said first statistical dispersion quantity may be a first variance ($\sigma_1^2$) of the numerical feature associated with the first packet flow portion and said second statistical dispersion quantity may be a second variance ($\sigma_2^2$) of the numerical feature associated with the second packet flow portion.

In the above detection method, said variation quantity may be related to a difference ($\delta$) between the first statistical dispersion quantity (Dq$_1$) and the second statistical dispersion quantity (Dq$_2$);

wherein said variation quantity may be a squared difference ($\delta$) of the first statistical dispersion quantity (Dq$_1$) and the second statistical dispersion quantity (Dq$_2$).

In the detection method of the present invention, extracting (203) samples of a numerical feature (x) may include selecting the numerical feature among a plurality of features comprising:

packet size in bytes;

total number of packets N$_{packet}$ in a time interval of length $\Delta$T;

total number of layer 3 bytes N$_{byte}$ in a time interval of length $\Delta$T;

average packet size N$_{size}$ in a time interval of length $\Delta$T, expressed in bytes;

packet rate R$_{packet}$ in a time interval of length $\Delta$T; and byte rate R$_{byte}$ in a time interval of length $\Delta$T.

In the detection method (300) of the invention, computing (304) each of said first variance ($\sigma_1^2$; $\sigma_j^2$) and second variance ($\sigma_2^2$; $\sigma_{j+1}^2$) may include:

computing the summation of the samples associated with one of said first and second packet flow portions;

computing the mean value of the samples associated with one of said first and second packet flow portions;

computing the summation of the squared distances from the mean value of the samples associated with one of said first and second packet flow portions; and computing each of said first and second variances from the corresponding summation of the squared distances from the mean value.

In the detection method of the present inventions, the step (202) of providing said first and second packet flow portions may comprise:

defining a first time window including the first packet flow portion and an associated first sample segment of the numerical feature; and defining a second time window including the second flow portion and an associated second sample segment of the numerical feature;

wherein said first statistical dispersion quantity ($Dq_1$) and said second statistical dispersion quantity ($Dq_2$) are computed from the first and second sample segments, respectively;

wherein the first and second windows may have a same time length; or wherein the second window may be shifted in time with respect to the first window (W1) by a delay;

wherein the detection method may further include, after a time interval equal to said delay;

defining further first and second windows by sliding the first and second windows by said delay; and repeating the method to detect an anomaly applying the method to further first and second packet flow portions corresponding to said further first and second windows, respectively; or wherein the first sample segment (W1') comprises an initial part of the second sample segment (W2); the second sample segment (W2) including an end part which is separate from the first segment;

wherein the detection method may further comprise, after a time interval equal to a delay;

defining further first and second sample segments by sliding the first and second sample segments by said delay; and repeating the method to detect an anomaly applying the method to further first and second sample segments; or wherein the second time window ($W_{j+1}$) may include a fixed initial time point coincident to a fixed initial time point of the first time window ($W_j$) and an end time point obtained by extending the first time window by an advancing time value.

The detection method (400) of the present invention may further comprise:

extracting (203j) further samples of a further numerical feature associated to a traffic status of the first and second packet flow portions;

computing (204j) from said further samples additional statistical dispersion quantities of said further numerical feature associated with the first and second packet flow portions; and computing (205j) a further variation quantity representing another dispersion change from the first packet flow portion to the second packet flow portion;

wherein computing from said dispersion quantities a variation quantity ($\Delta_{tot}$), representing a dispersion change from the first packet flow portion to the second packet flow portion, may include:

computing a first variation quantity from said dispersion quantities; and combining (401) the first variation quantity and the further variation quantity to obtain said variation quantity ($\Delta_{tot}$); or wherein comparing the variation quantity with a comparison value may further include:

comparing the further variation quantity with a further comparison value; and detecting an anomaly in the system in response to said comparison of the further variation quantity with the further comparison value.

In the detection method of the present invention, said first statistical dispersion quantity may be a first minimum mean squared deviation from any affine approximation of the numerical feature values associated with the first packet flow portion and said second statistical dispersion quantity is a second minimum mean squared deviation from any affine approximation of the numerical feature values associated with the second packet flow portion.

In the detection method of the above invention, computing the second statistical dispersion quantity ($Dq_2$) may include:

updating the computed first statistical dispersion quantity ($Dq_1$) taking into account samples of the second segment not included in the first segment.

The detection method of the present invention may further comprise:

selecting the comparison value (Thr) among: a fixed value, a variable value, an adaptive value, and a value depending on historical traffic data.

In the detection method of the present invention, the detected anomaly may be due to at least one of the following causes: a failure of a communication system element and an attack.

The detection method of the present invention may, further include:

aggregating samples of the numerical feature values of different network flows according to selected packet parameters (103); and applying the method to said aggregated samples.

In another aspect, the present invention relates to an apparatus (101) for detecting anomalies in a packet switched communication system, the apparatus comprising:

a collection module (102) for storing samples of a numerical packet feature (x) associated with a traffic status of a first packet flow portion (PFP1) and a second packet flow portion (PFP2);

a computing module (104) arranged so as to:

compute from said samples a first statistical dispersion quantity ($Dq_1$) and a second statistical dispersion quantity ($Dq_2$) of the numerical feature associated with the first and second packet flow portions, respectively; and compute from said dispersion quantities a variation quantity (A) representing a dispersion change from the first packet flow portion to the second packet flow portion; and a detection module (105) arranged so as to:

compare the variation quantity (A) with a comparison value (Thr); and detect an anomaly in the system in response to said comparison.

The apparatus (101) of the above invention may further comprise a flow aggregation module (103) for grouping numerical packet feature values of different network flows according to selected packet parameters.

Another aspect of the present invention relates to a packet switched communication system (100) comprising:

an extractor module (106) for extracting samples of a numerical feature (x) associated with a traffic status of a first packet flow portion (PFP1) and a second packet flow portion (PFP2); and an apparatus for detecting anomalies (101) connected to said extractor module and arranged in accordance with the apparatus for detecting anomalies in a packet switched communication system.

Still another aspect of the present invention relates to a computer program product comprising program codes suitable to perform the method of detecting anomalies in a communication system as set forth above.

BRIEF DESCRIPTION OF THE DRAWINGS

The characteristics and the advantages of the present invention will be better understood from the following detailed description of embodiments thereof, which is given by way of illustrative and non-limiting example with reference to the annexed drawings, in which.

DETAILED DESCRIPTION

Hereinafter, a communication system and several embodiments of a statistical anomaly detection method will be described. In particular, the anomalous traffic to be detected can be due to (D)DoS attacks, SPAM and/or SPIT attacks, scanning attacks, as well as malicious software attacks. It should be noticed that the teachings of the present invention can also be applied to detect anomalous traffic due to failures in hardware apparatuses or in software modules operating in the communication system.

Figure 1:
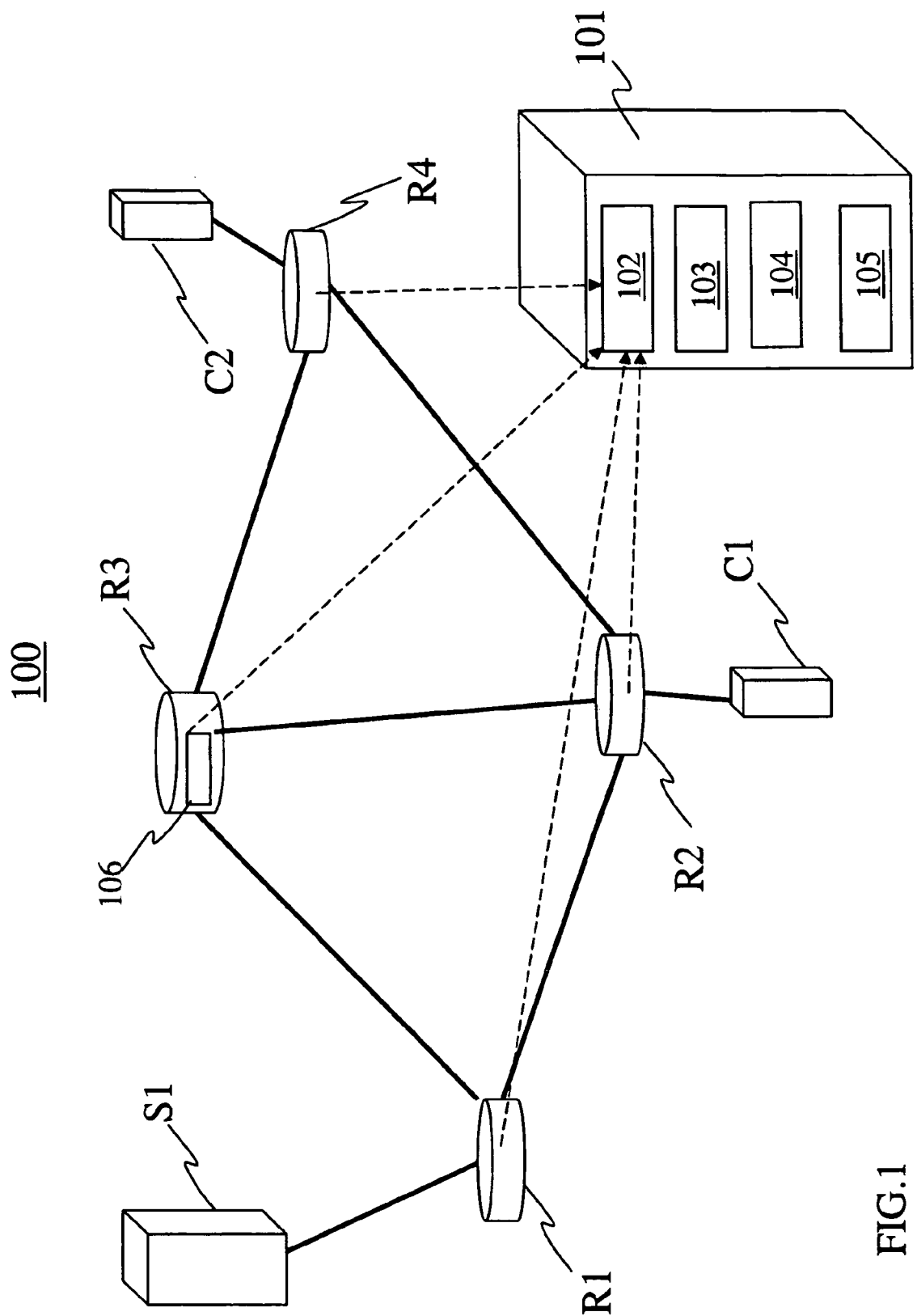
FIG. 1 schematically shows an example of a packet switched communication system comprising a detection apparatus, in accordance with the invention.

FIG. 1 shows schematically an example of a communication system 100 in which a method for detecting anomalous traffic can be implemented. The communication system 100 is a packet switched network and, for example, is a conventional Internet type network employing the IP protocol. Particularly, the communication system 100 can be a SIP (Session Initiation Protocol) network for transmitting SIP signaling packets such as, according to an example, packets relating to VoIP (Voice over Internet Protocol) traffic. The communication system 100 comprises a first end system S1 (e.g., a server apparatus), a second end system C1 and a third end-system C2 which are client apparatuses. Moreover, the exemplary communication system 100 is provided with a first router R1, a second router R2, a third router R3, and a fourth router R4, each of them suitable to extract the destination of a received packet, select the best path to that destination, and forward packets to the next device along this path. Routers R1-R4 and end systems S1, C1, and C2 are connected by channels of the guided type (such as fiber optic cables, coaxial cables, or other guided transmission means) or are connectable by radio signals. The teachings of the invention are applicable to a communication system having a different number of end systems and routers. The other apparatuses normally employed in a packet switched network and, particularly, the Internet, such as modems, switches, hubs, bridges, gateways, repeaters, and multiplexers, are not shown as they are evident to the skilled person.

The particular communication system 100 illustrated in FIG. 1 includes a detection apparatus 101, such as a processor and, particularly, a host computer, which is suitable to implement the anomaly detection method to be described hereinafter. According to an example, the detection apparatus 101 comprises a central processing unit, a work memory, a mass memory (such as a hard disk), user interfaces, as well as input and output ports allowing a communication with other devices (particularly, routers R1-R4) of the communication system 100. All these components are not shown in FIG. 1. As indicated in FIG. 1, the detection apparatus 101 also comprises: a data collection module 102, as an example connected with at least one of the routers R1-R4, an optional flow aggregation module 103, a statistical analysis module 104, and an alarm generation module 105. Examples of functions performed by the modules 102-105 will be described in greater detail later. Modules 102-105 can be hardware and/or software components and the detection apparatus can be located remotely from each of the routers R1-R4 or can be located by one of such routers, as an example, integrated in one of the routers R1-R4. According to another embodiment, the functions performed by modules 102-105 can be distributed among different suitable devices belonging to the communication system 100 or connected to such a system.

As known, the Open Systems Interconnection Basic Reference Model (OSI Reference Model or OSI Model for short) is a layered, abstract description for communications and computer network protocol design. It is also called the OSI seven layer model since it defines the following layers: application (7), presentation (6), session (5), transport (4), network (3), data link (2), and physical (1).

Layers 3 and 4 (the network and transport layers, respectively) include the following information of an IP packet: source IP address, TCP/UDP (Transmission Control Protocol/User Datagram Protocol) source port number, destination IP address, TCP/UDP destination port number, and transport protocol used (e.g., TCP or UDP). A series of packets having in common the above listed information is defined as a (network) "flow".

Example of an Anomaly Detection Method

Figure 2:
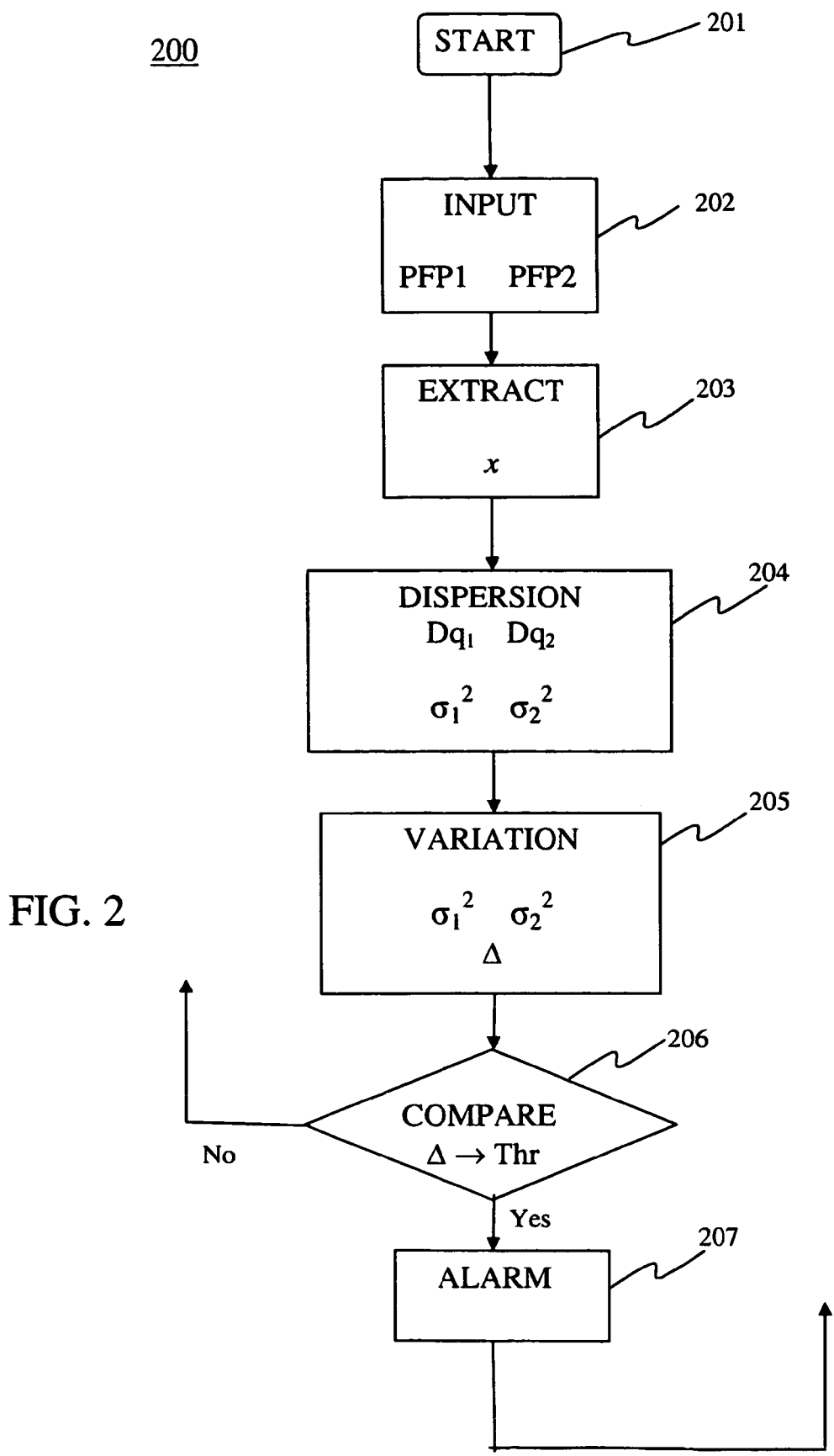
FIG. 2 illustrates by a flow chart an example of a method of detecting traffic anomaly, in accordance with the invention.

FIG. 2 shows by means of a flow chart an example of a method 200 employable for the detection of anomaly on the communication system 100, in accordance with the invention. As an example, this method can be implemented by the detection apparatus 101. The method 200 initially comprises a symbolic start step 201 (START) and an input step 202 (INPUT) wherein a first packet flow portion PFP1 and a second packet flow portion PFP2 are taken from the communication system 100, separated from each other, stored, and then provided as input to the subsequent steps of the method described. The first (PFP1) and the second (PFP2) packet flow portions are possibly defined (i.e. included) in elementary time intervals of length/duration ΔT. According to a first embodiment, the two flow portions PFP1 and PFP2 belong to the same network flow, as defined above.

Subsequently, in an extracting step 203 (EXTRACT), samples $(x_i)_1$ of a numerical feature x, associated to and describing a traffic status of the first flow portion PFP1 are extracted. Samples $(x_i)_2$ of the numerical feature x of the second packet flow portion PFP2 are also extracted. A numerical packet feature is any quantity extracted from network packets that can be expressed as numerical data by a real, rational, or integer number. According to this definition, it is meaningful to measure the distance or closeness between two numerical feature values by the Euclidean metric. Particularly, but not necessarily, a numerical packet feature may relate to and provide an indication about the traffic volume, i.e., the data amount transported by a packet or a packet flow portion. The definitions of some specific numerical packet features which can be extracted from packets are the following:

"size in bytes" of an IP packet is the total number of layer 3 bytes in a packet;

"total number of packets" ($N_{packet}$) and "total number of layer 3 bytes" ($N_{byte}$) in a considered elementary time interval of length $\Delta T$; these two features are statistics (i.e., numerical data) regarding a flow;

"average packet size" in an interval of length $\Delta T$, in bytes, is computed as $N_{size}=N_{byte}/N_{packet}$, provided that $N_{packet}>0$;

"packet rate" $R_{packet}=N_{packet}/\Delta T$ is the number of packets per second;

"byte rate" $R_{byte}=N_{byte}/\Delta T$ is the number of bytes per second.

The average packet size can also be expressed as $N_{size}=R_{byte}R_{packet}$. The reciprocal of $R_{packet}$ is the average inter-arrival time between two successive packets in a flow.

It is observed that the length $\Delta T$ essentially specifies the time resolution with which the traffic is monitored and analyzed and can be static or dynamic. The starting and ending times of the first and the last packet in a flow, respectively, as well as the total number of monitored flows can also be extracted in step 203. The basic numerical features described above, which are based on the information contained in layers 3 and 4 of packet headers are already available in commercial products used in IP networks such as routers and switches (e.g., the well-known Netflow data).

Furthermore, it is noticed that the extracting step 203 can be performed by a hardware and/or software extractor module 106 included in each or only in some of the routers R1-R4 or in other network nodes that are arranged to extract and transmit the extracted numerical features to the data collection module 102 of the detection apparatus 101 (FIG. 1).

In a computing step 204 (DISPERSION), a first statistical dispersion quantity $Dq_1$ of the numerical feature x associated with the first packet portion PFP1 is computed on the basis of the corresponding numerical feature samples $(x_i)_1$. Moreover, a second statistical dispersion quantity $Dq_2$ of the numerical feature x associated with the second packet portion PFP2 is computed on the basis of the corresponding numerical feature samples $(x_i)_2$.

A statistical dispersion quantity of a set of numerical data is a measure of how the observed numerical values in the data set are dispersed from each other with respect to the Euclidean or other related metrics among real numbers. Particularly, a statistical dispersion quantity is a real number that is equal to zero if all the data values are identical, and generally increases as the data values become more dispersed. Examples of statistical dispersion quantity are: the variance defined as the mean squared deviation of the numerical values from their arithmetic mean value; the standard deviation defined as the square root of the variance; the mean absolute deviation of the numerical values from their arithmetic mean value; the minimum mean squared deviation of the numerical values from any affine approximation, where the optimal affine approximation of numerical data, minimizing this mean squared deviation, can be determined by linear regression techniques as will be clarified later.

According to a particular embodiment, the first $Dq_1$ and second $Dq_2$ statistical dispersion quantities are a first variance $\sigma_1^2$ and a second variance $\sigma_2^2$, respectively. The computing 204 of the first and second statistical dispersion quantities can be performed, according to the example, by the statistical analysis module 104.

In a further computing step 205 (VARIATION), a variation quantity $\Delta$ is computed from the first statistical dispersion quantity ($Dq_1$) and the second statistical dispersion quantity ($Dq_2$). The variation quantity $\Delta$ measures a statistical variation or change between the first statistical dispersion quantity ($Dq_1$) associated with the first packet flow portion PFP1 and the second statistical dispersion quantity ($Dq_2$) associated with the second packet flow portion PFP2. Preferably, the expected value of the variation quantity $\Delta$ should be relatively small if the first packet flow portion PFP1 and the second packet flow portion PFP2 are both drawn from a same probability distribution. Particularly, the variation quantity can be related to a difference between said first variance $\sigma_1^2$ and said second variance $\sigma_2^2$ in which case it measures a change of variance for the two packet flow portions observed. The computation of the variation quantity $\Delta$ can be carried out by the statistical analysis module 104.

The variation quantity $\Delta$ is compared, in a comparison step 206 (COMPARE), with comparison value such as a threshold value Thr. According to said comparison step 206, if the threshold value Thr is exceeded, then an anomaly is detected (branch Yes) and an alarm signal ALARM is generated in an alarm issuing step 207. If the threshold value Thr is not exceeded, then an anomaly is not detected (branch No) and an alarm signal ALARM is not generated. Particularly, the comparison and the alarm generation step 207 can be performed by the above mentioned alarm generation module 105. The threshold can be static or dynamic and can be determined on the basis of historical data. In particular, a dynamic threshold can change adaptively.

Following a positive (Yes) or negative (No) anomaly detection, the detection method 200 can be repeated in connection with further packet flow portions. Particularly, the further packet flow portions can lie in time intervals whose end points are delayed with respect to the ones in which the first (PFP1) and second (PFP2) packet flow portions were included. Even more particularly, the further packet flow portions can lie in time intervals whose both start and end points are delayed with respect to the ones in which the first (PFP1) and second (PFP2) packet flow portions were included.

Due to the fact that the computation of the dispersion quantities (particularly, the two variances) is performed in delayed time intervals, the method 200 is also called "the moving variance method". It should be noticed that for each monitored flow portion, not only a single numerical packet feature, but also a plurality of numerical packet features can be extracted, stored, and analyzed. For example, the following features can be considered: $R_{packet}$, $R_{byte}$, and $N_{size}$. It is observed that any two of the numerical features $R_{packet}$, $R_{byte}$, and $N_{size}$ are mutually independent.

Any such feature can be used to detect a respective anomaly. In particular, the average packet size $N_{size}$ is preferable for detecting anomalous traffic comprising repeated transmission of essentially the same or similar packets (e.g., packets with the same payload), because in this case $N_{size}$ changes its probability distribution over time with respect to normal traffic, e.g., its variance over time may be reduced. For example, if a message flooding (D)DoS attack is in progress on a SIP network, then it may be likely that a particular type of SIP messages/packets (e.g., INVITE, RE-INVITE, BYE, or REGISTER) is (much) more frequent than the others.

Moreover, in addition to the average packet size $N_{size}$ also the packet rate $R_{packet}$ is monitored and involved into the anomaly detection method 200. For most anomalous traffic, such as the request or message flooding and reflection DDoS traffic, the traffic volume is increased and this is reflected in an increased value of $R_{packet}$. However, an increased $R_{packet}$ can also be caused by normal traffic such as flash crowds. Also, in case of DDoS attacks, the traffic volume is high near the target, but may be low near the distributed sources of the attack. Therefore, it is preferable to employ not only the packet rate $R_{packet}$ but also at least one additional packet feature.

The detection criteria for a detection method employing a plurality of numerical packet features will be described in greater detail later, with reference to a fifth embodiment and to FIG. 11.

The features $N_{size}$ and $R_{packet}$ or other can numerical packet features c be traced in time at a chosen network node (i.e., a router) or a set of nodes, for each individual flow or for certain selected flows, e.g., according to the packet rate. Alternatively, in accordance with a particular example, the numerical feature values for individual flows can be aggregated in groups according to selected packet parameters such as the source or destination IP addresses or the source or destination port numbers. For example, the flows can be grouped for the same source IP address or the same destination IP address. In the former case, the flow statistics correspond to the outbound traffic from a particular network node, and in the latter, they correspond to the inbound traffic to a particular network node. The number of simultaneously monitored flows with the same IP address as the source/destination address indicates the activity of a node with that IP address as the source/destination node in the observed time interval, respectively. The detection method 200 can be applied to any group of aggregated numerical packet feature values. The feature grouping step can be performed by the flow aggregation module 103 (FIG. 1).

Alternatively, the features for all the flows monitored can be grouped together, in particular, by distinguishing the direction of flows, regardless of the particular source/destination IP addresses. This type of grouping is interesting for a high level analysis which does not pay attention to particular nodes or users, but rather to the network traffic as a whole. Instead of the IP addresses, the features grouping can be made according to the port numbers, which are indicative of the applications of the packets transmitted.

With reference to the numerical feature selection, is also possible to extract and use information contained in other layers such as the application layer (layer 7), in addition to the numerical packet features extracted from layers 3 and 4. In particular, the layer 7 information can be used to aggregate the numerical features. For example, for SIP packets, the type of packet being transmitted or a source or destination SIP URI (Universal Resource Identifier) can be extracted and then used for aggregating the basic numerical packet features related to layers 3 and 4. In some applications, certain statistics from the payloads, e.g., related to the relative frequency of patterns can also be extracted and used as numerical packet features.

First Embodiment

A first embodiment 300 of the detection method 200 (i.e., "the moving variance method"), is described herein below with reference to FIG. 3. This first embodiment is hereinafter also called "the sliding variance method". Numerical feature x is one of the above identified numerical features, expressed by a real, rational, or integer number, extracted from flows of network packets, at a chosen network node, in (elementary) short time intervals of length $\Delta T$, in some time units (e.g., $\Delta T$ is comprised in 1 s-5 min), where $\Delta T$ can vary in time. In particular, as indicated above, x can be the packet rate $R_{packet}$, the average packet size $N_{size}$, or the byte rate $R_{byte}$. For $R_{packet}$ and $R_{byte}$, the zero values are allowed, if there are no packets with chosen features in the considered short time interval, whereas $N_{size}$ has to be positive and it is not defined if in the considered short time interval there are no packets with chosen features. The corresponding sequence of samples of the feature x taken in time is denoted as $(x_i)_{i=1}^{\infty}$.

As regards step 202 of FIG. 2, wherein the two packet portions PFP1 and PFP2 are defined, the method 200 is based on sliding windows, i.e., time intervals that are sliding in time. Particularly, a time interval of a length T (greater than $\Delta T$) that is sliding in time, is defined. The time interval of length T, starting from an initial position, each time advances $\tau$ units of time (delay), where $\tau$ is a given parameter. If $\Delta T$ is static, i.e., fixed, then T and $\tau$ can be defined as fixed integer multiples of $\Delta T$. If $\Delta T$ is dynamic, i.e., variable in time, then it is assumed that each sliding window contains an integer number of short time intervals and approximately has the same length T.

Figure 6:
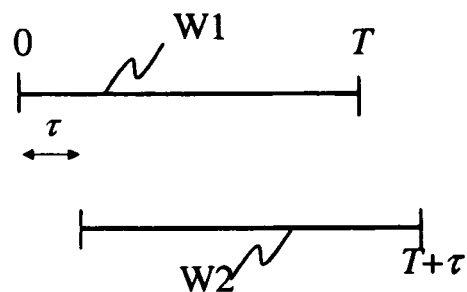
FIG. 6 shows two exemplary time windows defined in accordance with said first embodiment.

Accordingly, two successive windows of (approximately) the same length T are shifted $\tau$ units of time from each other and hence overlap over $T-\tau$ units of time. In this embodiment, at any given time, the packet flow portion PFP1 then corresponds to a sliding window at this time and the packet flow portion PFP2 corresponds to the next sliding window, delayed by $\tau$. It should be noted that samples of the numerical features x can be taken irregularly in time, i.e., in time intervals of possibly variable length $\Delta T$. In this case, the number of samples per sliding window may vary in time, and so do the numbers of overlapping and non-overlapping samples in two successive sliding windows. FIG. 6 schematically illustrates two time intervals corresponding to two exemplary sliding windows: the first window W1 extends from time 0 to T and the second window W2 extends from time $\tau$ to $T+\tau$.

Figure 3:
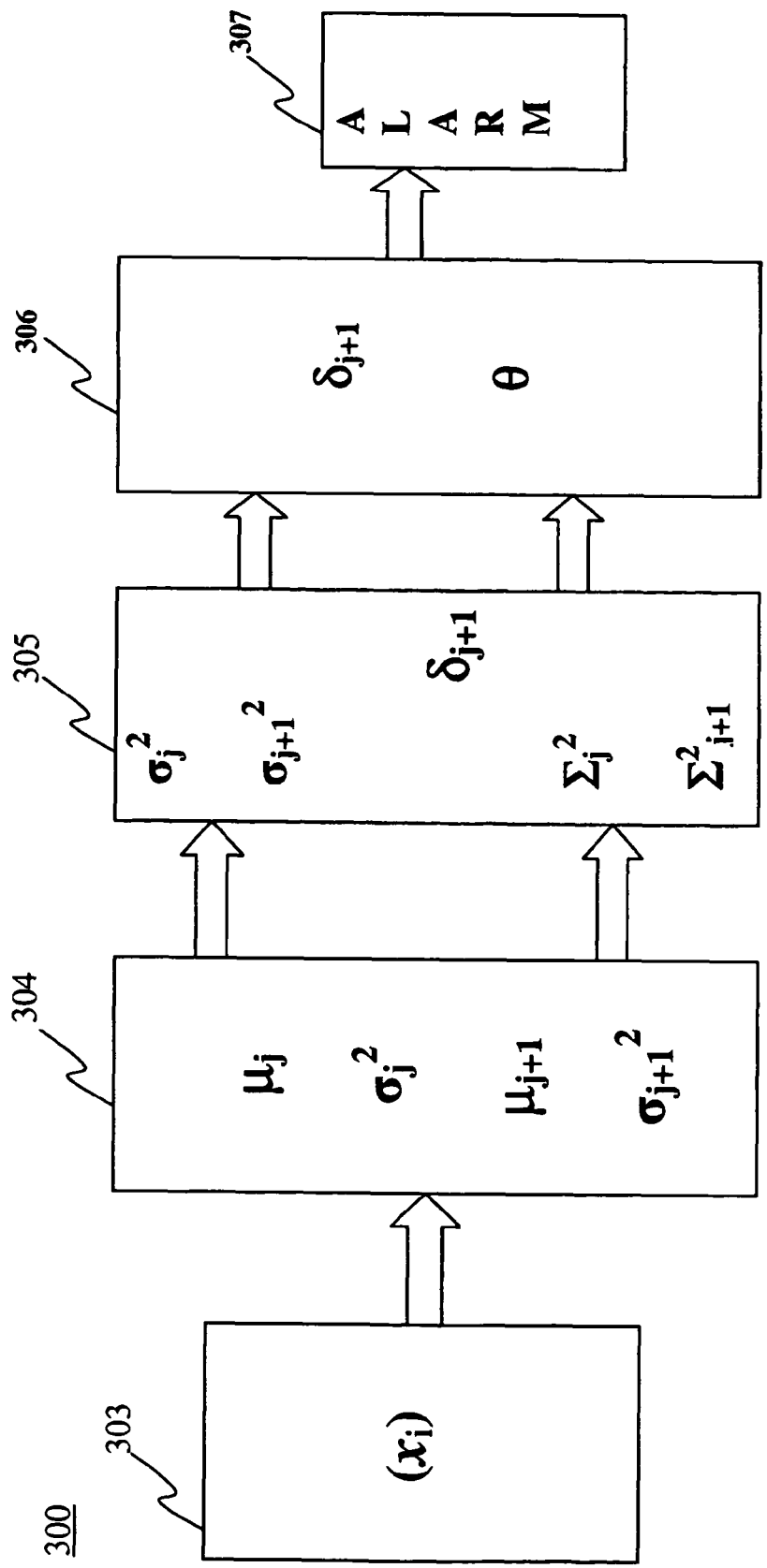
FIG. 3 shows a first embodiment of said example of the method of detecting traffic anomaly.

As shown by means of functional blocks in FIG. 3, in a storing step 303, a segment of numerical features samples $$(x_i)_{i=m_j-n_j+1}^{m_j} \quad (1)$$

corresponding to a $j^{th}$ sliding window of length T (e.g., window W1 of FIG. 6), such as the one associated with the first packet flow portion PFP1 of step 202 in FIG. 2, is stored. The indexes in expression (1) represent the following:

i indicates a sample number,
j indicates a window number,
$m_j$ indicates the end point of a window,
$n_j$ indicates the number of samples in a window.

The number of samples $n_j$ in the window/segment is in general variable.

In a computing step 304, the following statistical quantities are computed:

$$S_j = \sum_{i=m_j-n_j+1}^{m_j} x_i \quad (2)$$

$$\mu_j = \frac{S_j}{n_j} \quad (3)$$

$$\Sigma_j^2 = \sum_{i=m_j-n_j+1}^{m_j} (x_i - \mu_j)^2. \quad (4)$$

Here, $S_j$ is the summation of the samples, $\mu_j$ is the mean value, and $\Sigma_j^2$ is the summation of the squared distances/deviations of the samples from the mean value. The first variance $\sigma_j^2$ is then computed according to the following expression:

$$\sigma_j^2 = \frac{\Sigma_j^2}{n_j}. \quad (5)$$

According to a further embodiment, for obtaining unbiased estimates of variance, it is possible to divide by $n_j-1$ instead of $n_j$. The first variance $\sigma_j^2$ as a measure of dispersion of numerical samples in the considered sliding window is thus associated with the first packet flow portion PFP1.

Analogously, a segment of numerical features samples $$(x_i)_{i=m_{j+1}-n_{j+1}+1}^{m_{j+1}} \quad (6)$$

corresponding to a $(j+1)^{th}$ sliding window of length T (e.g., second window W2 of FIG. 6), such as the one associated with the second packet flow portion PFP2 of step 202 in FIG. 2, is stored. In a computing step 304, the mean value $\mu_{j+1}$ and the second variance $\sigma_{j+1}^2$ associated with the second sliding window of the second packet flow portion PFP2 are then computed applying the expressions (2)-(5) to the segment (6).

In a computing step 305, the variation quantity Δ is computed from said first $\sigma_j^2$ and second $\sigma_{j+1}^2$ variances. According to the example described, the variation quantity is a relative squared difference $\delta_{j+1}$ of variances for the two successive segments (1) and (6) and can be computed by the following formula:

$$\delta_{j+1} = \frac{(\sigma_{j+1}^2 - \sigma_j^2)^2}{\sigma_{j+1}^2 \sigma_j^2}. \quad (7)$$

According to another particular example, the relative squared difference $\delta_{j+1}$ can be obtained by the following equivalent formula:

$$\delta_{j+1} = \frac{(n_j \Sigma_{j+1}^2 - n_{j+1} \Sigma_j^2)^2}{n_j \Sigma_{j+1}^2 n_{j+1} \Sigma_j^2}. \quad (8)$$

If formula (8) is applied, then the variances according to expression (5) are not explicitly computed. However, it should be noticed that computation (7) in terms of the variances (i.e., mean squared deviations or normalized $\Sigma^2$ values) is less sensitive to numerical errors than the computation (8) in terms of the $\Sigma^2$ values. It is observed that the quantity $\Sigma^2$, as a total squared deviation, is also a statistical dispersion quantity.

In a comparison step 306, the relative squared difference $\delta_{j+1}$ is then compared with a fixed or dynamic threshold $\theta_{j+1}$, where generally the threshold increases as T/τ decreases. If the threshold is exceeded once or repeatedly a specified number of times in successive computations, where this number may increase as the ratio T/τ decreases, then an alarm ALARM for anomalous traffic is generated in an alarm step 307.

Figure 4:
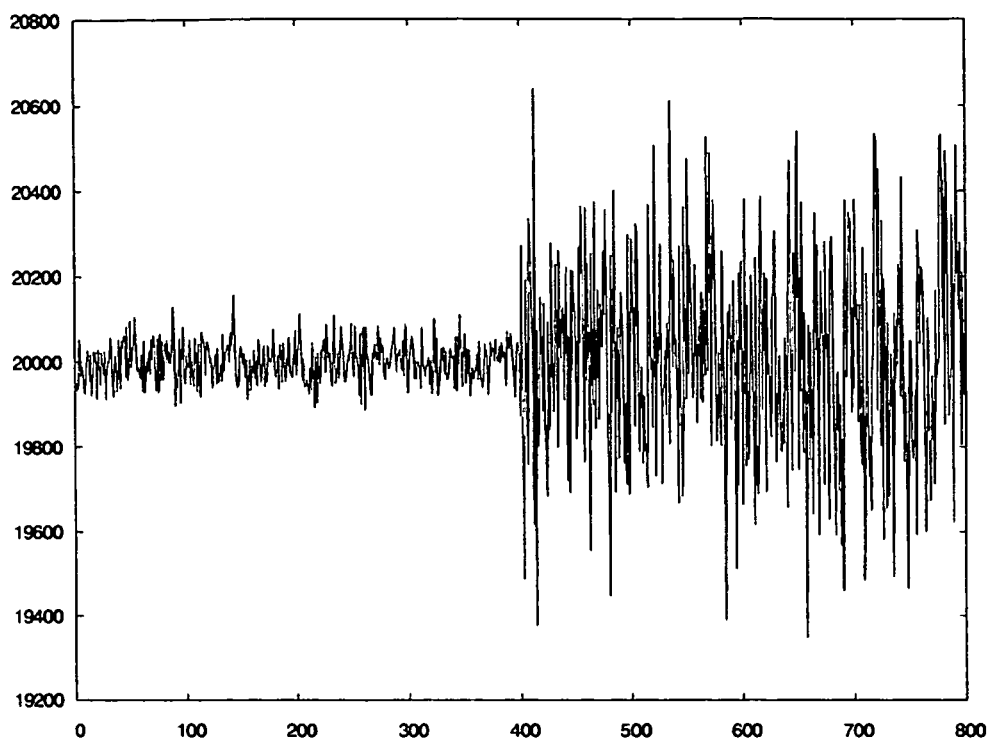
FIG. 4 shows a curve representing the behavior of data generated by a computer simulation.
Figure 5:
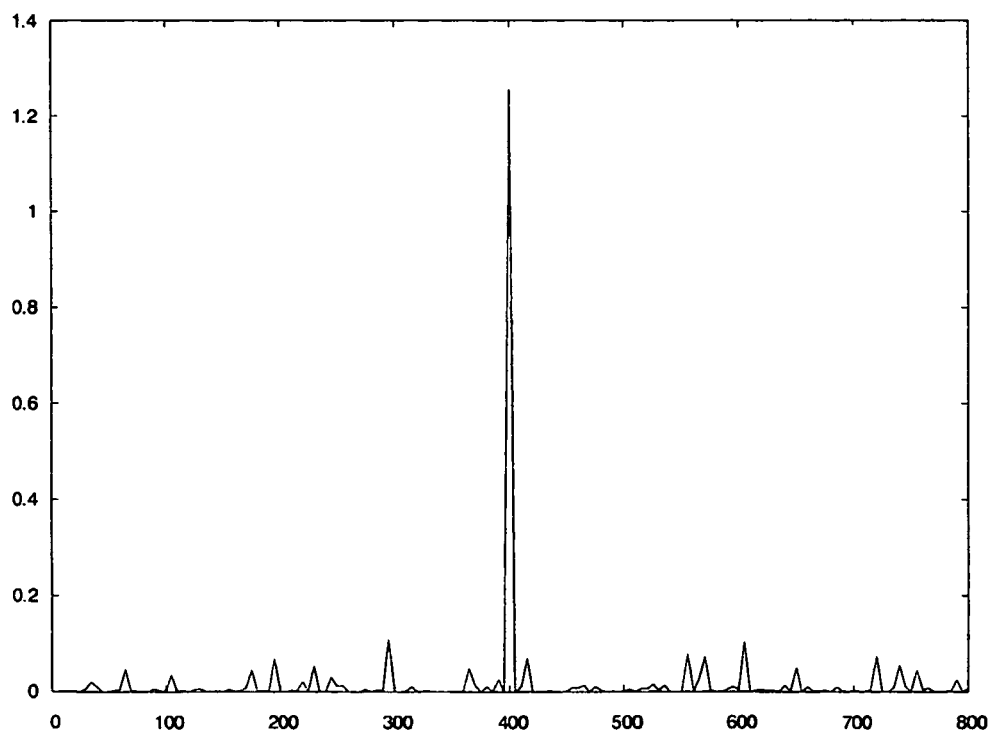
FIG. 5 shows the detection of anomalous traffic for the data of FIG. 4 obtained with a simulation of said first embodiment.

FIG. 4 and FIG. 5 refer to a computer simulation. The curve of FIG. 4 shows the sample data versus the sample indexes i, 0-800, whereas the resulting curve of relative squared differences δ of variances for the sliding variance method applied to data of FIG. 4 is shown in FIG. 5. In this example, the data consists of 801 samples, where the samples numbered 0-400 are produced as independent samples according to the Gaussian distribution with the mean value 20000 and the variance 2000, whereas the samples numbered 401-800 are produced as independent samples according to the Gaussian distribution with the same mean value 20000 and the increased variance 64000. In FIG. 5, the window duration used is T=20 data samples and the time resolution is τ=5 data samples. It is observed that an alert is issued at the rising edge of the curve of FIG. 5 and such rising edge is particularly sharp-cut.

With reference to the threshold definition and according to an example, the threshold θ may be a fixed value as it relates to the relative instead of absolute change of variances, and not to the change of mean values, which is expected to be considerable even for normal traffic. More precisely, if the samples are drawn independently according to the same probability distribution, then, even if two successive segments are not overlapping (i.e., if τ=T), the relative squared difference of variances δ is bounded most of the time by a small value inversely proportional to the number of samples in a segment, independently of the variance of the samples.

In accordance with another example, to account for changes of variance in normal traffic, the threshold θ could be determined possibly from historical data for normal traffic, at a considered network node, in order to keep the false positive rate reasonably low. In particular, it may depend on the time of the day. Particularly, the threshold can be chosen irrespectively of statistical model estimating the traffic behavior.

Given an appropriate value of the threshold θ, it is then expected that the probability that the threshold is exceeded, i.e., the false-positive rate is low for normal traffic, whereas at times where there is a change from normal traffic to anomalous traffic, it is expected that the threshold is not exceeded with a low probability, i.e., with a low false-negative rate. It is noticed that the method is robust as the changes are related to variances and not to the mean values. Moreover, it is robust since the method 300 exploits the relative, not absolute changes in variance. However, in some applications, absolute changes in variance can be used, but then the thresholds may be variable.

It should be noticed that the value of the delay or shift τ determines the resolution of the above proposed statistical anomaly detection method 300, because it takes τ units of time, or a small multiple of τ units of time, in order to detect a change from normal to anomalous traffic. Preferably, the value of T should be large enough in order to obtain relatively stable estimates of variance so that for normal traffic the relative changes of variance are not too large. On the other hand, the ratio T/τ should not be too large so that the change of traffic from normal to anomalous does not require a very small threshold θ to be detected. For example, the ratio T/τ may be chosen so as to satisfy the following expression:

$$1 \leq T/\tau \leq 10 \quad (9)$$

In particular, it is suggested that using the average packet size $N_{size}$ as the packet feature x is especially useful for detecting anomalous traffic, e.g., due to (D)DoS attacks, port scanning attacks, SPAM and SPIT attacks, as well as malicious software attacks. In this case, in addition to detecting a considerable relative change in variance, a decrease of the variance can be detected as well.

Second Embodiment

According to a second example of the detection method 200, the two successive windows are defined in a different way with respect to the first embodiment.

According to this second example, in step 202 at time j+1, the following first and second sample segments corresponding to packet flow portions PFP1 and PFP2, respectively, are considered:

$$(x_i)_{i=m_{j+1}-n_{j+1}+1}^{m_j} \quad (10)$$

$$(x_i)_{i=m_{j+1}-n_{j+1}+1}^{m_j} \quad (11)$$

where the first segment (10) is the initial part of the second segment, without the ending part $(x_i)_{i=m_j+1}^{m_{j+1}}$ or, equivalently, the last part of the preceding segment $(x_i)_{i=m_j-n_j+1}^{m_j}$, without the initial part $(x_i)_{i=m_j-n_j+1}^{m_{j+1}-n_{j+1}}$.

Figure 7:
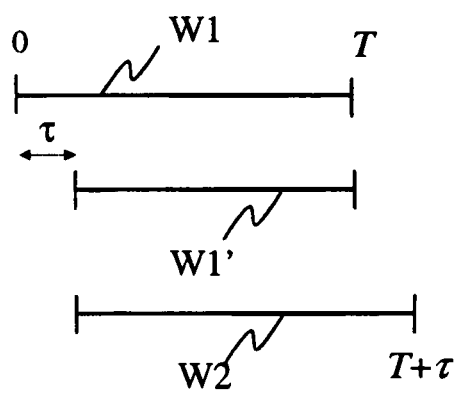
FIG. 7 illustrates two exemplary time windows defined in accordance with a second embodiment of said example of the method for detecting traffic anomalies.

FIG. 7 shows schematically two successive sliding windows W1 and W2, as in FIG. 6, with the difference that the first packet flow portion PFP1 is now determined by a shortened window W1', extending from τ to T, whereas the second packet flow portion PFP2 is determined by W2 as in FIG. 6. In this way, the past data leaving the current sliding window are thus excluded from the variance comparison.

Moreover, in step 204 the first variance $\hat{\sigma}_j^2$ measuring the dispersion of the first, shortened sample segment (10) is computed. In accordance with this second example, the following expressions can be employed:

$$\hat{S}_j = \sum_{i=m_{j+1}-n_{j+1}+1}^{m_j} x_i \quad (12)$$

$$\hat{\mu}_j = \frac{\hat{S}_j}{n_{j+1} - m_{j+1} + m_j} \quad (13)$$

$$\hat{\Sigma}_j^2 = \sum_{i=m_{j+1}-n_{j+1}+1}^{m_j} (x_i - \hat{\mu}_j)^2 \quad (14)$$

$$\hat{\sigma}_j^2 = \frac{\hat{\Sigma}_j^2}{n_{j+1} - m_{j+1} + m_j}. \quad (15)$$

Moreover, also in step 204, the second variance $\tau_{j+1}^2$ measuring the dispersion of the second samples segment (11) is then computed in the same way as in the first embodiment, i.e., by using expressions (2)-(5). Particularly, the second variance $\sigma_{j+1}^2$ is given by the following formula:

$$\sigma_{j+1}^2 = \frac{\Sigma_{j+1}^2}{n_{j+1}}. \quad (16)$$

In step 205, the relative squared difference of variances of the two segments is then computed as:

$$\delta_{j+1} = \frac{(\sigma_{j+1}^2 - \hat{\sigma}_j^2)^2}{\sigma_{j+1}^2 \hat{\sigma}_j^2} = \frac{((n_{j+1} - m_{j+1} + m_j)\Sigma_{j+1}^2 - n_{j+1}\hat{\Sigma}_j^2)^2}{(n_{j+1} - m_{j+1} + m_j)\Sigma_{j+1}^2 n_{j+1}\hat{\Sigma}_j^2}. \quad (17)$$

As is clear from expression (17), similarly as in the first embodiment, the relative squared difference of variances $\delta_{j+1}$ can be obtained with or without the explicit computation of the variances, i.e., by using the normalized $\Sigma^2$ values or the $\Sigma^2$ values without normalization. As indicated in step 206, the relative squared difference of variances $\delta_{j+1}$ is then compared with a threshold, where the threshold may be somewhat reduced in comparison with the one of the sliding variance method 300.

Namely, for normal traffic, the variances for the two segments under consideration (such as the windows W2 and W1' in FIG. 7) are then expected to be less mutually different than in the sliding variance method 300 (e.g., using the windows W2 and W1 in FIG. 6).

It should be observed that this second embodiment of the method 200 may be more suitable than the first embodiment 300 for detecting anomalous traffic of duration shorter than the window size T. This is due to the fact that in the first embodiment, a considerable change in variance, due to the beginning of anomalous traffic, would be detected not only by the ending point of the sliding-window (such as the window W2 in FIG. 6), when it enters the segment of anomalous traffic, but also by the initial part of the sliding window (such as the window W2 in FIG. 6), when it leaves the segment of normal traffic and enters the segment of anomalous traffic. On the other hand, in the second embodiment, a change of variance will then be detected only by the ending point of the sliding window (such as the window W2 in FIG. 7).

Third Embodiment

Figure 8:
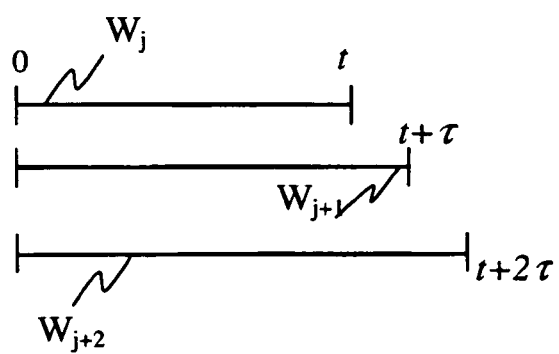
FIG. 8 illustrates three exemplary time windows defined in accordance with a third embodiment of said example of the method for detecting traffic anomalies.

In a third embodiment of the detection method 200, a moving window of increasing length is defined. Such moving window extends from a chosen initial time up to the current time, and each time, the ending point of the moving window advances τ units of time, where r determines the resolution in time for detecting the anomalous changes in traffic. FIG. 8 shows schematically three exemplary successive windows $W_j$, $W_{j+1}$, and $W_{j+2}$ drawn in accordance with this third embodiment of the detection method 200. In FIG. 8, t denotes a generic time.

At each time, the packet flow portions PFP1 and PFP2 correspond to two successive moving windows. Accordingly, for a generic window index j, the packet flow portion PFP1 is defined by the segment $$(x_i)_{i=1}^{m_j}, \quad (18)$$

which is associated with the $j^{th}$ moving window containing $m_j$ samples, and the packet flow portion PFP2 is defined by the segment $$(x_i)_{i=1}^{m_{j+1}}, \quad (19)$$

which is associated with the $(j+1)^{th}$ moving window containing $m_{j+1}$ samples.

In step 204, at each time, i.e., for each moving window, the variance is computed by a weighted average technique, e.g., by a standard EWMA (Exponentially Weighted Moving Average) technique.

According to a standard EWMA technique, an iterative-recursive computation of the mean value and the variance of the data for every new data sample is performed. The quantities $\mu_k$ and $\sigma_k^2$ are the estimated mean value and variance, respectively, of a generic sub-segment $(x_i)_{i=1}^{k}$ of k initial data samples. The two segments defined by the expressions (18) and (19) given above then correspond to the values $k=m_j$ and $k=m_{j+1}$, respectively. Given two constants α and β, satisfying $0 \leq \alpha, \beta \leq 1$, $\mu_k$ and $\sigma_k^2$ are then iteratively computed, for $k=1, 2, \ldots$, as:

$$\mu_{k+1} = \beta x_{k+1} + (1-\beta)\mu_k \qquad (20)$$

$$\sigma_{k+1}^2 = \alpha(x_{k+1} - \mu_{k+1})^2 + (1-\alpha)\sigma_k^2 \qquad (21)$$

with the initial values $\mu_1 = x_1$ and $\sigma_1^2 = 0$. In a particular case, we may have $\alpha = \beta$.

The explicit solution for the mean value is given by:

$$\mu_k = (1-\beta)^{k-1} x_1 + \beta \sum_{i=2}^{k} (1-\beta)^{k-i} x_i, \qquad (22)$$

and the explicit solution for the variance is given by:

$$\sigma_k^2 = \alpha \sum_{i=2}^{k} (1-\alpha)^{k-i} (x_i - \mu_i)^2. \qquad (23)$$

According to this embodiment, the variance at time k measures the exponentially weighted average deviation of the initial k data samples from the corresponding mean values at the same times. Using the above identified formulas (20)-(23) the variances of the first and second segments (18) and (19) are computed by setting $k=m_j$ and $k=m_{j+1}$, respectively.

In the step 205, the relative squared difference of variances for two segments $(x_i)_{i=1}^{m_j}$ and $x_{i=1}^{m_{j+1}}$ corresponding to two successive moving windows, to be compared with a static or dynamic threshold, is then computed as:

$$\delta_{j+1} = \frac{(\sigma_{m_{j+1}}^2 - \sigma_{m_j}^2)^2}{\sigma_{m_{j+1}}^2 \sigma_{m_j}^2}. \qquad (24)$$

Fourth Embodiment

In accordance with a fourth embodiment which is alternative to the above described third embodiment, the mean value $\mu_k$ and variance $\sigma_k^2$ are the estimated by a new proposed EWMA technique. According to this technique adapted to the moving variance method, $\mu_k$ and $\sigma_k^2$ are iteratively computed, computed, for $k=1, 2, \ldots$, as:

$$\mu_{k+1} = \beta x_{k+1} + (1-\beta)\mu_k \qquad (25)$$

$$\xi_{k+1}^2 = \alpha(x_{k+1})^2 + (1-\alpha)\xi_k^2 \qquad (26)$$

$$\sigma_{k+1}^2 = \xi_{k+1}^2 - (\mu_{k+1})^2 \qquad (27)$$

with the initial values $\mu_1 = x_1$ and $\xi_1^2 = (x_1)^2$, where $\xi_k^2$ denotes the estimated second moment of the data on the segment $(x_i)_{i=1}^k$. In a particular case, $\alpha = \beta$.

The explicit solution for the mean value is still given by:

$$\mu_k = (1-\beta)^{k-1} x_1 + \beta \sum_{i=2}^{k} (1-\beta)^{k-i} x_i, \qquad (28)$$

whereas, the explicit solution for the second moment is given by:

$$\xi_k^2 = (1-\alpha)^{k-1}(x_1)^2 + \alpha \sum_{i=2}^{k} (1-\alpha)^{k-i}(x_i)^2. \qquad (29)$$

In the case when $\alpha = \beta$, the explicit solution for the variance is given by:

$$\sigma_k^2 = \alpha \sum_{i=2}^{k} (1-\alpha)^{k-i} (x_i - \mu_k)^2. \qquad (30)$$

Therefore, according to this fourth embodiment, the variance at time k measures the exponentially weighted average deviation of the initial k data samples from the overall mean value at time k, which corresponds to the whole moving window at time k. The fourth embodiment is hence more sensitive than the third embodiment with respect to detecting anomalous changes in traffic data.

For both third and fourth embodiments, the values of the constants $\alpha$ and $\beta$ determine the effective number of past samples influencing the variance and mean value estimates, respectively. More precisely, these numbers increase as the constants $\alpha$ and $\beta$ decrease. In particular, the values of the constants $\alpha$ and $\beta$ close to one, which are typically used in standard applications of the EWMA technique (e.g., for detecting the data outliers or for reducing the noise in given data) do not appear to be suitable for the described detection method, where smaller values of the constants $\alpha$ and $\beta$ are preferred.

In any case, it is preferable to choose the constants $\alpha$ and $\beta$ in accordance with the statistical properties of the normal traffic. In general, the faster the variance variations in normal traffic are expected, the bigger the constants should be chosen.

Also for the fourth embodiment described with reference formulas (25)-(30), the relative squared difference of variances for two segments $(x_i)_{i=1}^{m_j}$ and $(x_i)_{i=1}^{m_{j+1}}$ corresponding to two successive moving windows, to be compared with a static or dynamic threshold, is then computed by the above mentioned formula (24).

The Applicant observes that the above description of the methods applying the EWMA techniques enables efficient computation, by using the corresponding recursions. These recursions allow a considerable data memory reduction in comparison with the first two embodiments.

Figure 9:
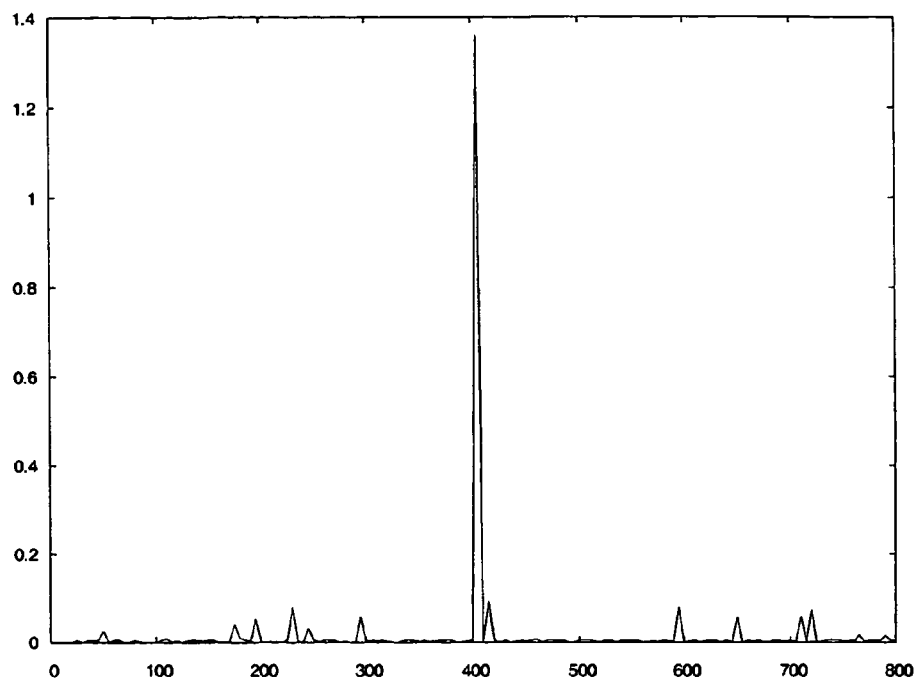
FIG. 9 shows the detection of anomalous traffic for the data of FIG. 4 obtained with a simulation of said third embodiment.
Figure 10:
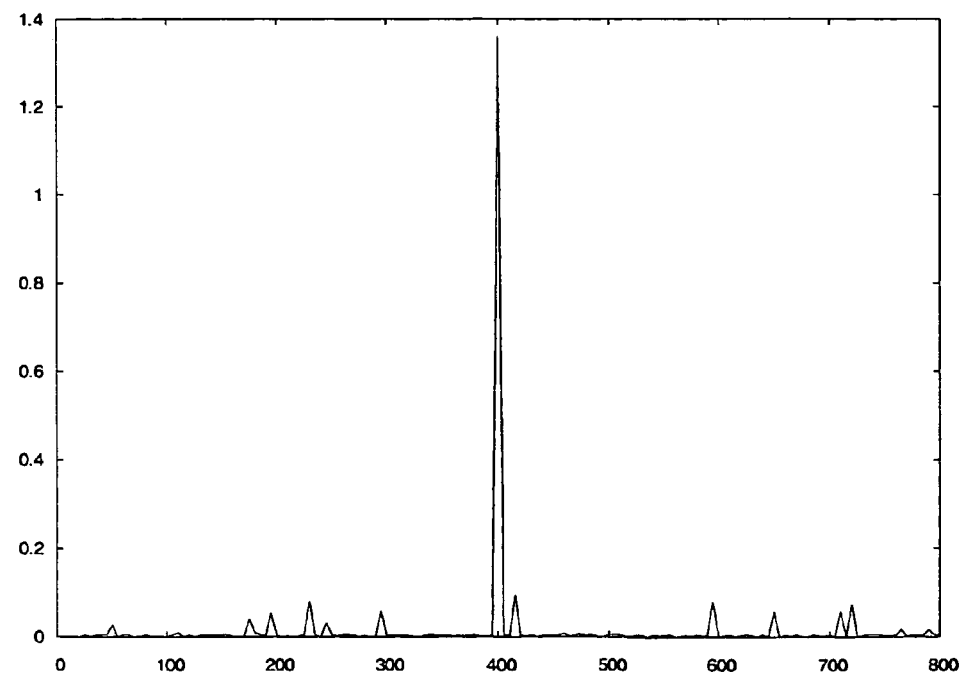
FIG. 10 shows the detection of anomalous traffic for the data of FIG. 4 obtained with a simulation of a fourth embodiment of said example of the method for detecting traffic anomalies.

The Applicant has performed computer simulations relating to the above described third and fourth embodiments of the detection method 200. For the same data shown in FIG. 4, the resulting curves of relative squared differences of variances for the third embodiment (formulas (20)-(24)) and the fourth embodiment (formulas (25)-(30) and (24)) are depicted in FIG. 9 and FIG. 10, respectively. For both third and fourth embodiments, the constants used are $\alpha = \beta = 0.07$ and the time resolution is $\tau = 5$ data samples. It should be noticed that an alert is issued at the rising edge of the respective curves and such rising edges are particularly sharp-cut.

Fifth Embodiment

Figure 11:
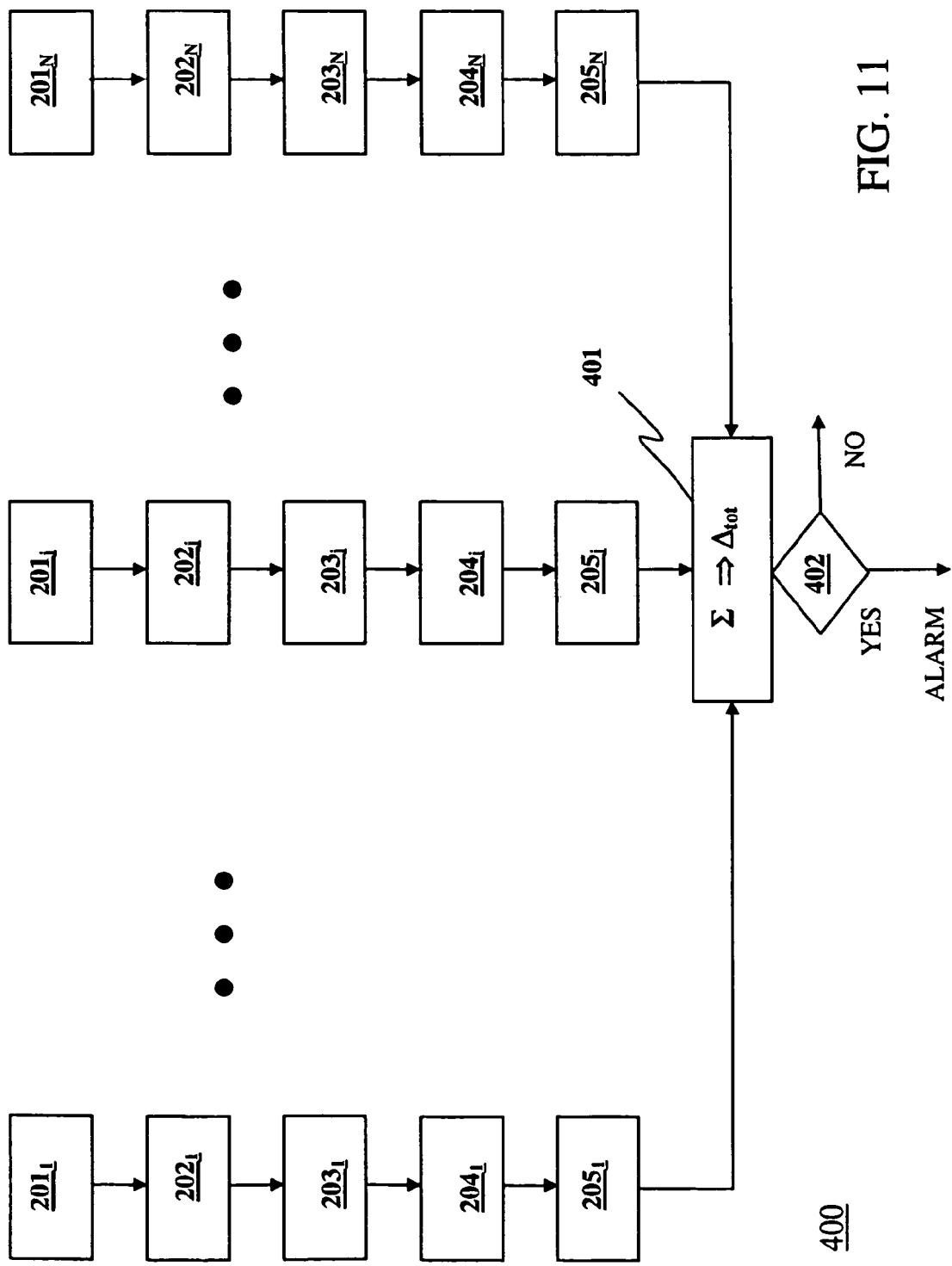
FIG. 11 illustrates by a flow chart a fifth embodiment of said example of the method for detecting traffic anomalies.

In a fifth embodiment 400 of the present invention schematically shown in FIG. 11, a number of numerical packet features are employed simultaneously. In accordance with this fifth embodiment 400 and under the assumption that the numerical packet features are roughly independent, a plurality of N variances associated with different numerical packet features are computed. Particularly, steps 201-205 of the exemplary method 200 are repeated for each different numerical packet feature, for j=1, ..., N.

Moreover, for each considered numerical packet feature, a relative squared difference of variances $\delta_j$ is computed, for j=1, ..., N. In a further step 401 ($\Sigma$), the relative squared differences of variances $\delta_1, ..., \delta_N$ are combined to obtain a total variation quantity $\Delta_{tot}$. According to an example, the combination step is a summation of said relative squared differences of variances $\delta_1 ..., \delta_N$. The total variation quantity $\Delta_{tot}$ is then compared (step 402) with a threshold value Thr in order to detect an anomalous condition which can cause the generation of an alarm signal or message ALARM (branch Yes). The comparison of the total variation quantity $\Delta_{tot}$ with the threshold value Thr could detect a normal traffic condition (branch No) and, in this case, no alarm signals or messages are generated.

It should be noticed that the combination step 401 may be performed by different types of combination algorithms. According to another particular example, prior to performing the summation, the relative squared differences of variances $\delta_1, ..., \delta_N$ are multiplied with different weights that may be associated with individual numerical packet features.

Moreover, different decision criteria may be employed. According to an example, a total variation quantity $\Delta_{tot}$ is not computed and comparisons of each of the relative squared difference of variances $\delta_1, ..., \delta_N$ with a respective threshold is performed. An alarm signal is then generated if at least a specified number of said comparisons detect an anomalous traffic condition. According to another example, in addition to the variation quantity criterion, aiming at detecting sudden changes of variance, one may also take into account other criteria, e.g., for message flooding (D)DoS attacks, one may require that there is also a significant change of the packet rate $R_{packet}$ or the byte rate $R_{byte}$.

According to yet another example, the result of the comparison of the variation quantity (such as the relative squared differences of variances) with a threshold is logically combined with changes in other statistical quantities, e.g., the mean values of the numerical packet features chosen.

The Applicant notices that the use of the relative squared differences $\delta$ expressed by formulas (7), (8), (17), and (24) are particularly advantageous as it has the capacity for detecting an increase as well as a decrease of variance, as can be readily seen from the following equivalent expression:

$$\delta_{j+1} = \frac{(\sigma_{j+1}^2 - \sigma_j^2)^2}{\sigma_{j+1}^2 \sigma_j^2} = \frac{\sigma_{j+1}^2}{\sigma_j^2} + \frac{\sigma_j^2}{\sigma_{j+1}^2} - 2. \quad (31)$$

According to another example of method 200, in all the embodiments described, the variation quantity 6, (step 205 in FIG. 2) can be computed as a relative difference adapted for detecting either an increase of variance (i.e., $\sigma_{j+1}^2 > \sigma_j^2$), by $$\delta_{j+1} = \left(\frac{\sigma_{j+1}^2}{\sigma_j^2} - 1\right)^2 \quad (32)$$

or a decrease of variance (i.e., $\sigma_{j+1}^2 > \sigma_j^2$), by $$\delta_{j+1} = \left(\frac{\sigma_j^2}{\sigma_{j+1}^2} - 1\right)^2. \quad (33)$$

Sixth Embodiment

According to a sixth embodiment of method 200, applicable to sliding windows (FIG. 6) described with reference to the first embodiment 300 or moving windows (FIG. 7) described with reference to the second embodiment, a statistical dispersion quantity is computed not only as a variance, but in a modified way, which will be illustrated further below.

More precisely, for a sliding window segment $(x_i)_{i=m_j-n_j+1}^{m_j}$ given by the expression (1), instead of computing only the variance by using the expressions (2)-(5) as in the first embodiment, a first statistical dispersion quantity $\epsilon_j^2$ is computed by the following formula:

$$\varepsilon_j^2 = \sigma_j^2 - \frac{\left(\left(\frac{1}{n_j}\sum_{i=m_j-n_j+1}^{m_j}(i-m_j+n_j)x_i\right) - \mu_j \frac{n_j+1}{2}\right)^2}{(n_j^2-1)/2}. \quad (34)$$

For a shortened sliding window segment given by the expression (10), instead of computing only the variance by using the expressions (12)-(15) as in the second embodiment, a first statistical dispersion quantity $\hat{\epsilon}_j^2$ is computed by the formula analogous to (34).

A second statistical dispersion quantity $\epsilon_{j+1}^2$, associated with the sliding window segment given by the expression (6), is computed by the formula (34) by setting the index j to j+1. The first and the second statistical dispersion quantities $\epsilon_j^2$ and $\epsilon_{j+1}^2$ are then used to compute the variation quantity $\delta_{j+1}$, as an example, according to the following formula:

$$\delta_{j+1} = \frac{(\varepsilon_{j+1}^2 - \varepsilon_j^2)^2}{\varepsilon_{j+1}^2 \varepsilon_j^2}. \quad (35)$$

The first and the second statistical dispersion quantities $\hat{\epsilon}_j^2$ and $\epsilon_{j+1}^2$ are used to compute the variation quantity $\delta_{j+1}$ in an analogous way.

This sixth embodiment is particularly suitable to detect anomalies in normal traffic data that is non-stationary or correlated on the sliding windows considered, e.g., when the sliding window duration T is relatively long and, in particular, when the elementary time interval $\Delta T$ is relatively long (e.g., $\Delta T$=5 min).

Namely, the variance $\sigma_j^2$, on a $j^{th}$ sliding window, can equivalently be regarded as the minimum mean squared deviation of data from any constant approximation of data, where this minimum is achieved if (and only if) the constant, used for the approximation, is equal to the mean value of data.

In a more general setting, the statistical dispersion quantity $\epsilon_j^2$, defined as above, is equal to the minimum mean squared deviation of data from any affine approximation of data. It is noted that an affine approximation is an affine function of data, which itself is the sum of a linear function and a constant. The optimal affine approximation minimizing this mean squared deviation can be determined by the linear regression techniques and is not shown here, because all what matters is the resulting minimum mean squared deviation, which is given by the formula (34), for a segment of data samples $(x_i)_{i=m_j-n_j+1}^{m_j}$ corresponding to a generic $j^{th}$ sliding window.

The formula (34) is valid under the assumption of regular data sampling, i.e., that the elementary time intervals have a fixed duration $\Delta T$. The expression is readily generalized to deal with irregular data sampling, by substituting the irregular normalized timings of the data samples in the considered sliding window for the regular normalized timings $i-m_j+n_j$, $i=m_j-n_j+1, \ldots, m_j$, and by substituting the corresponding mean value of irregular normalized timings for the mean value of regular normalized timings $(n_j+1)/2$.

The generalized mean squared deviation is used in the same way as the variance. If the data is stationary and uncorrelated, then $\epsilon_j^2 \approx \delta_j^2$. However, if the normal traffic data is non-stationary or correlated, then $\epsilon_j^2$ can be considerably smaller than $\sigma_j^2$ and as such is more robust to be used as a measure of variation of data, because it eliminates linear trends in the normal traffic data, due to its non-stationarity or correlation. On the other hand, $\epsilon_j^2$ is less sensitive to anomalous changes of traffic data.

Seventh Embodiment

A seventh embodiment refers to the same definition of sliding windows as described in relation to the first embodiment 300 (FIG. 6), but employs computation algorithms for the variance a and the relative squared difference of variances δ different from the ones of the first embodiment 300. It is observed that according to the first embodiment 300 the variance σ is repeatedly computed for overlapping segments that may have a lot of data samples in common.

According to the seventh embodiment, instead of re-computing the variance for each new sliding segment by using the expressions (2)-(5) and the relative squared difference of variances by using the expression (7) or (8), the variance already computed for the preceding segment as well as the corresponding relative squared difference of variances are being updated. This approach allows one to save in computations. With reference to the data memory requirements, also for the seventh embodiment all the data samples belonging to a preceding sliding window for which the variance was previously computed need to be stored.

As described with reference to the first embodiment 300 (FIG. 6), two successive sliding segments $(x_i)_{i=m_j-n_j+1}^{m_j}$ and $(x_i)_{i=m_{j+1}-n_{j+1}+1}^{m_{j+1}}$ can be expressed by (1) and (6), respectively. Then the number of samples from the second segment (6) not included in the first segment (1) is $m_{j+1}-m_j$, whereas the number of samples from the first segment (1) not included in the second segment (6) is $m_{j+1}-m_j-n_{j+1}+n_j$. As these two numbers are different if $n_{j+1} \neq n_j$, it is suitable to define their maximum $\Delta n_j$ by:

$$\Delta n_j = \max(m_{j+1}-m_j, m_{j+1}-m_j-n_{j+1}+n_j). \quad (36)$$

Also, the following auxiliary value is defined as:

$$\mu'_j = \frac{S_j}{n_{j+1}}. \quad (37)$$

The seventh embodiment includes an initial step in which, with reference to a sliding window with index j=1, the following quantities are computed: $S_1, \mu_1, \Sigma_1^2$, and $\sigma_1^2$. Then the mean values and variances, are iteratively computed for j=1, 2, 3, ..., by using the following update expressions:

$$S_{j+1} = S_j + \sum_{i=0}^{\Delta n_j - 1} \left( x'_{m_{j+1}-i} - x'_{m_{j+1}-n_{j+1}-i} \right) \quad (38)$$

$$\mu_{j+1} = \frac{S_{j+1}}{n_{j+1}} \quad (39)$$

$$\mu'_j = \frac{S_j}{n_{j+1}} \quad (40)$$

$$\Sigma_{j+1}^2 = \Sigma_j^2 + \sum_{i=0}^{\Delta n_j - 1} \left( \begin{array}{c} x'_{m_{j+1}-i} - \\ x'_{m_{j+1}-n_{j+1}-i} \end{array} \right) \left( \begin{array}{c} x'_{m_{j+1}-i} - \mu_{j+1} + \\ x'_{m_{j+1}-n_{j+1}-i} - \mu'_j \end{array} \right) - \quad (41)$$
$$\mu_j \mu'_j (n_{j+1} - n_j),$$

where $$x'_{m_{j+1}-i} = \begin{cases} x_{m_{j+1}-i}, & i \leq m_{j+1} - m_j - 1 \\ 0, & i \geq m_{j+1} - m_j \end{cases} \quad (42)$$

$$x'_{m_{j+1}-n_{j+1}-i} = \begin{cases} x_{m_{j+1}-n_{j+1}-i}, & i \leq m_{j+1} - m_j - n_{j+1} + n_j - 1 \\ 0, & i \geq m_{j+1} - m_j - n_{j+1} + n_j. \end{cases} \quad (43)$$

It is noted that (42) and (43) can equivalently be defined as follows: $x'_{m_{j+1}-i}$ is equal to $x_{m_{j+1}-i}$ if $x'_{m_{j+1}-i}$ belongs to the last part of the second segment not contained in the first segment and $x'_{m_{j+1}-n_{j+1}-i}$ is equal to if $x_{m_{j+1}-n_{j+1}-i}$ belongs to the initial part of the first segment not contained in the second segment and to zero otherwise, respectively. In other words, the shorter of the two non-overlapping parts of the two segments, which is not contained in the other segment, is filled in with zeros.

The relative squared difference of variances can then be computed as:

$$\delta_{j+1} = \frac{(\sigma_{j+1}^2 - \sigma_j^2)^2}{\sigma_{j+1}^2 \sigma_j^2} = \frac{(n_j \Sigma_{j+1}^2 - n_{j+1} \Sigma_j^2)^2}{n_j \Sigma_{j+1}^2 n_{j+1} \Sigma_j^2} = \frac{1}{\Sigma_{j+1}^2 \Sigma_j^2} \quad (44)$$

$$\left( \sqrt{\frac{n_j}{n_{j+1}}} \sum_{i=0}^{\Delta n_j - 1} \left( \begin{array}{c} x'_{m_{j+1}-i} - \\ x'_{m_{j+1}-n_{j+1}-i} \end{array} \right) \left( \begin{array}{c} x'_{m_{j+1}-i} - \mu_{j+1} + \\ x'_{m_{j+1}-n_{j+1}-i} - \mu'_j \end{array} \right) - \right)^2$$
$$\frac{n_{j+1} - n_j}{\sqrt{n_j n_{j+1}}} (\Sigma_j^2 + S_j \mu'_j)$$

In the case when the numbers of samples in two successive segments are equal, i.e., $n_{j+1} = n_j$, $n\Delta_j$ is given as:

$$\Delta n_j = m_{j+1} - m_j \quad (45)$$

and the update expressions and the expression for the relative squared difference then simplify into:

$$\mu_{j+1} = \mu_j + \frac{\sum_{i=0}^{\Delta n_j - 1} (x_{m_{j+1}-i} - x_{m_{j+1}-n_{j+1}-i})}{n_j} \quad (46)$$

$$\Sigma_{j+1}^2 = \Sigma_j^2 + \sum_{i=0}^{\Delta n_j - 1} \left( \begin{array}{c} x_{m_{j+1}-i} - \\ x_{m_{j+1}-n_{j+1}-i} \end{array} \right) \left( \begin{array}{c} x_{m_{j+1}-i} - \mu_{j+1} + \\ x_{m_{j+1}-n_{j+1}-i} - \mu_j \end{array} \right) \quad (47)$$

$$\delta_{j+1} = \frac{(\sigma_{j+1}^2 - \sigma_j^2)^2}{\sigma_{j+1}^2 \sigma_j^2} \quad (48)$$

$$= \frac{(\Sigma_{j+1}^2 - \Sigma_j^2)^2}{\Sigma_{j+1}^2 \Sigma_j^2}$$

$$= \frac{1}{\Sigma_{j+1}^2 \Sigma_j^2} \left( \sum_{i=0}^{\Delta n_j - 1} \left( \frac{x_{m_{j+1}-i} -}{x_{m_{j+1}-n_{j+1}-i}} \right) \left( \frac{x_{m_{j+1}-i} - \mu_{j+1} +}{x_{m_{j+1}-n_{j+1}-i} - \mu_j} \right) \right)^2.$$

Eighth Embodiment

An eighth embodiment refers to sliding windows of the type described for the second embodiment (FIG. 7), but employs computation algorithms for the variance a and the relative squared difference of variances g different from the ones of the second embodiment. For the second embodiment described above, the variances are computed and compared for two overlapping segments $(x_i)_{i=m_j-n_{j+1}+1}^{m_j}$ and $(x_i)_{i=m_{j+1}-n_{j+1}+1}^{m_{j+1}}$ given by the expressions (10) and (11), respectively, for each j=1, 2, 3, . . . . According to the eighth embodiment, a basic way of performing more efficient computations is to compute the variances separately for the sliding segments (11), for j=1, 2, 3, . . . , and for the shortened sliding segments (10), for j=1, 2, 3, . . . , by using the update expressions given above according to the seventh embodiment, which are adapted to deal with the shortened sliding windows. This roughly doubles the computation time in comparison with the seventh embodiment.

According to the eighth embodiment, another, even more efficient way of performing the computations is to compute the variances for the shortened sliding segments (10), for j=1, 2, 3, . . . , by using adapted update expressions from the seventh embodiment. Then, for each j=1, 2, 3, . . . , the variance of segment (11) is computed from the variance of segment (10), together with the corresponding relative squared difference to of the two variances, either by using the adapted update expressions or, alternatively, by using the following simplified and numerically more convenient expressions, in which $\Delta n_j = m_{j+1} - m_j$ and $\hat{n}_j = n_{j+1} - \Delta n_j$:

$$\mu_{j+1} = \hat{\mu}_j + \frac{\sum_{i=0}^{\Delta n_j - 1} (x_{m_{j+1}} - \hat{\mu}_j)}{n_{j+1}} \quad (49)$$

$$\Sigma_{j+1}^2 = \hat{\Sigma}_j^2 + \sum_{i=0}^{\Delta n_j - 1} (x_{m_{j+1}-i} - \hat{\mu}_j)(x_{m_{j+1}-i} - \mu_{j+1}) \quad (50)$$

$$\delta_{j+1} = \frac{(\sigma_{j+1}^2 - \hat{\sigma}_j^2)^2}{\sigma_{j+1}^2 \hat{\sigma}_j^2} \quad (51)$$

$$= \frac{(\hat{n}_j \Sigma_{j+1}^2 - n_{j+1} \hat{\Sigma}_j^2)^2}{\hat{n}_j \Sigma_{j+1}^2 n_{j+1} \hat{\Sigma}_j^2}$$

$$= \frac{1}{\Sigma_{j+1}^2 \hat{\Sigma}_j^2} \left( \sqrt{\frac{\hat{n}_j}{n_{j+1}}} \sum_{i=0}^{\Delta n_j - 1} \left( \frac{x_{m_{j+1}-i} -}{\hat{\mu}_j} \right) \left( \frac{x_{m_{j+1}-i} -}{\mu_{j+1}} \right) - \frac{\Delta n_j}{\sqrt{\hat{n}_j n_{j+1}}} \hat{\Sigma}_j^2 \right)^2.$$

Ninth Embodiment

In accordance with a ninth embodiment, employing the minimum mean squared deviation $\epsilon_j^2$ described with reference to the sixth embodiment, the corresponding expression for the mean squared deviation $\epsilon_j^2$ is updated by updating the variance $\sigma_j^2$ and the mean value $\mu_j$ in the same way as defined above for the seventh or the eighth embodiment, as well as by updating the arithmetic mean:

$$\frac{1}{n_j} \sum_{i=m_j-n_j+1}^{m_j} (i - m_j + n_j) x_i. \quad (52)$$

More precisely, for the windows according to the first embodiment 300 described above, the arithmetic mean associated with $(x_i)_{i=m_{j+1}-n_{j+1}+1}^{m_{j+1}}$ can be computed from the arithmetic mean associated with $(x_i)_{i=m_j-n_{j+1}+1}^{m_j}$ by using:

$$\frac{1}{n_{j+1}} \sum_{i=m_{j+1}-n_{j+1}+1}^{m_{j+1}} (i - m_{j+1} + n_{j+1}) x_i = \quad (53)$$

$$\frac{n_j}{n_{j+1}} \left( \frac{1}{n_j} \sum_{i=m_j-n_j+1}^{m_j} (i - m_j + n_j) x_i \right) +$$

$$\frac{1}{n_{j+1}} \left( \sum_{i=m_j+1}^{m_{j+1}} (i - m_j + n_j) x_i - \sum_{i=m_j-n_j+1}^{m_{j+1}-n_{j+1}} (i - m_j + n_j) x_i \right) -$$

$$(m_{j+1} - m_j - n_{j+1} + n_j) \mu_{j+1}.$$

Similarly, for the windows according to the second embodiment described above, the arithmetic mean associated with $(x_i)_{i=m_{j+1}-n_{j+1}+1}^{m_{j+1}}$ can be computed from the arithmetic mean associated with $(x_i)_{i=m_{j+1}-n_{j+1}+1}^{m_j}$ by using:

$$\frac{1}{n_{j+1}} \sum_{i=m_{j+1}-n_{j+1}+1}^{m_{j+1}} (i - m_{j+1} + n_{j+1}) x_i = \quad (54)$$

$$\frac{\hat{n}_j}{n_{j+1}} \left( \frac{1}{\hat{n}_j} \sum_{i=m_{j+1}-n_{j+1}+1}^{m_j} (i - m_{j+1} + n_{j+1}) x_i \right) +$$

$$\frac{1}{n_{j+1}} \left( \sum_{i=m_j+1}^{m_{j+1}} (i - m_{j+1} + n_{j+1}) x_i \right).$$

The findings and teachings of the present invention show many advantages. Theoretical considerations and the simulations made (e.g., FIG. 4, FIG. 5, FIG. 9, and FIG. 10) indicate that the methods described are reliable for detecting anomalies in traffic data due to a change of variance, regardless of the absolute value of this variance.

Moreover, it should be observed that the example of FIG. 2 and the other described embodiments can be implemented by avoiding a comparison of the current traffic with a corresponding statistical model based on historical data, which is typical of the prior art methods. It has to be noticed that if the estimated statistical model of the traffic does not reflect the normal traffic behavior sufficiently accurately, then the false-positive rate will be high, provided that the thresholds are chosen so as to achieve a reasonably low false-negative rate.

Alternatively, if the thresholds are chosen so as to achieve a reasonable low false-positive rate, then the false-negative rate will be high. Therefore, the possibility of performing a detection irrespective of statistical models, improves the reliability of the described detection methods in comparison with prior art techniques (for example, see the above mentioned article "Load characterization and anomaly detection for voice over IP traffic", M. Mandjes, I. Saniee, and A. L. Stolyar).

Furthermore, the methods described above are mathematically relatively simple, sufficiently robust to changes inherent to normal traffic, and yet capable of detecting anomalous traffic due to attacks such as (D)DoS attacks, SPAM and SPIT attacks, and scanning attacks, as well as massive malicious software attacks. For example, the detection methods described above do not need complex computations in contrast with the wavelet computation disclosed in the above cited paper "DDoS detection and wavelets", L. Li and G. Lee. As such, they are suitable to be applied in high-speed and high-volume communication networks.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of detecting anomalies in a communication system, comprising:
   providing a first packet flow portion and a second packet flow portion;
   extracting samples of a numerical feature associated with a traffic status of the first and second packet flow portions;
   computing from said extracted samples a first statistical dispersion quantity and a second statistical dispersion quantity of the numerical feature associated with the first and second packet flow portions, respectively;
   computing from said dispersion quantities a variation quantity representing a dispersion change from the first packet flow portion to the second packet flow portion, wherein said variation quantity is a squared difference of the first statistical dispersion quantity and the second statistical dispersion quantity;
   comparing the variation quantity with a comparison value; and
   detecting an anomaly in the system in response to said comparison.

2. The detection method of claim 1, wherein said first statistical dispersion quantity is a first variance of the numerical feature associated with the first packet flow portion and said second statistical dispersion quantity is a second variance of the numerical feature associated with the second packet flow portion.

3. The detection method of claim 2, wherein computing each of said first variance and second variance comprises:
   computing a summation of the samples associated with one of said first and second packet flow portions;
   computing a mean value of the samples associated with one of said first and second packet flow portions;
   computing a summation of the squared distances from the mean value of the samples associated with one of said first and second packet flow portions; and
   computing each of said first and second variances from the corresponding summation of the squared distances from the mean value.

4. The detection method of claim 1, wherein extracting samples of a numerical feature comprises selecting the numerical feature from a plurality of features comprising:
   packet size in bytes;
   total number of packets in a time interval of length;
   total number of layer 3 bytes in a time interval of length;
   average packet size in a time interval of length, expressed in bytes;
   packet rate in a time interval of length; and
   byte rate in a time interval of length.

5. The detection method of claim 1, wherein providing said first and second packet flow portions comprises:
   defining a first time window comprising the first packet flow portion and an associated first sample segment of the numerical feature; and
   defining a second time window comprising the second flow portion and an associated second sample segment of the numerical feature,
   wherein said first statistical dispersion quantity and said second statistical dispersion quantity are computed from the first and second sample segments, respectively.

6. The detection method of claim 5, wherein the first and second windows have a same time length.

7. The detection method of claim 5, wherein the second window is shifted in time with respect to the first window by a delay.

8. The detection method of claim 7, further comprising after a time interval equal to said delay:
   defining further first and second windows by sliding the first and second windows by said delay; and
   repeating the method to detect an anomaly applying the method to further first and second packet flow portions corresponding to said further first and second windows, respectively.

9. The detection method of claim 5, wherein the first sample segment comprises an initial part of the second sample segment, the second sample segment comprising an end part which is separate from the first segment.

10. The detection method of claim 9, further comprising, after a time interval equal to a delay:
    defining further first and second sample segments by sliding the first and second sample segments by said delay; and
    repeating the method to detect an anomaly applying the method to further first and second sample segments.

11. The detection method of claim 5, wherein the second time window comprises a fixed initial time point coincident to a fixed initial time point of the first time window and an end time point obtained by extending the first time window by an advancing time value.

12. The detection method of claim 5, wherein computing the second statistical dispersion quantity comprises:
    updating the computed first statistical dispersion quantity taking into account samples of the second segment not included in the first segment.

13. The detection method of claim 1, further comprising:
    extracting further samples of a further numerical feature associated with a traffic status of the first and second packet flow portions;
    computing from said further samples additional statistical dispersion quantities of said further numerical feature associated with the first and second packet flow portions; and
    computing a further variation quantity representing another dispersion change from the first packet flow portion to the second packet flow portion.

14. The detection method of claim 13, wherein computing from said dispersion quantities a variation quantity, representing a dispersion change from the first packet flow portion to the second packet flow portion, comprises:

computing a first variation quantity from said dispersion quantities; and combining the first variation quantity and the further variation quantity to obtain said variation quantity.

15. The detection method of claim 13, wherein comparing the variation quantity with a comparison value further comprises:

comparing the further variation quantity with a further comparison value; and detecting an anomaly in the system in response to said comparison of the further variation quantity with the further comparison value.

16. The detection method of claim 1, wherein said further statistical dispersion quantity is a first minimum mean squared deviation from any affine approximation of numerical feature values associated with the first packet flow portion and said second statistical dispersion quantity is a second minimum mean squared deviation from any affine approximation of numerical feature values associated with the second packet flow portion.

17. The detection method of claim 1, further comprising:

selecting the comparison value from: a fixed value, a variable value, an adaptive value, and a value depending on historical traffic data.

18. The detection method of claim 1, wherein the detected anomaly is due to at least one of the following causes: a failure of a communication system element and an attack.

19. The detection method of claim 1, further comprising:

aggregating samples of the numerical feature values of different network flows according to selected packet parameters; and applying the method to said aggregated samples.

20. A non-transitory computer-readable medium storing a computer program product comprising program codes that when executed, perform the detection method of detecting anomalies in the communication system according to claim 1.

21. An apparatus capable of detecting anomalies in a packet switched communication system, comprising:

a hardware collection module capable of storing samples of a numerical packet feature associated with traffic status of a first packet flow portion and a second packet flow portion;

a hardware computing module capable of being arranged so as to:

compute from said samples a first statistical dispersion quantity and a second statistical dispersion quantity of the numerical feature associated with the first and second packet flow portions, respectively; and compute from said dispersion quantities a variation quantity representing a dispersion change from the first packet flow portion to the second packet flow portion, wherein said variation quantity is a squared difference of the first statistical dispersion quantity and the second statistical dispersion quantity; and a hardware detection module arranged so as to:

compare the variation quantity with a comparison value; and detect an anomaly in the system in response to said comparison.

22. The apparatus of claim 21, further comprising a flow aggregation module for grouping numerical packet feature values of different network flows according to selected packet parameters.

23. The apparatus of claim 21 further comprising:

an extractor module capable of extracting samples of said numerical feature associated with said traffic status of said first packet flow portion and said second packet flow portion.

\* \* \* \* \*